United States Patent [19]

Matsuoka et al.

[11] Patent Number: 5,226,351
[45] Date of Patent: Jul. 13, 1993

[54] VEHICLE TRANSMISSION SHIFT CONTROL APPARATUS USING SHIFT BOUNDARY LINES BASED ON VEHICLE SPEED, AND ENGINE INTAKE AIR QUANTITY OR THROTTLE OR ACCELERATOR OPERATION AMOUNT

[75] Inventors: Hiroki Matsuoka, Susono; Norihisa Nakagawa, Numazu, both of Japan

[73] Assignee: Toyota Jidosha Kabushiki Kaisha, Toyota, Japan

[21] Appl. No.: 891,161

[22] Filed: May 29, 1992

[30] Foreign Application Priority Data

| Jun. 4, 1991 [JP] | Japan | 3-133050 |
| Aug. 2, 1991 [JP] | Japan | 3-217802 |
| Aug. 2, 1991 [JP] | Japan | 3-217803 |
| Aug. 2, 1991 [JP] | Japan | 3-217804 |
| Aug. 2, 1991 [JP] | Japan | 3-217805 |

[51] Int. Cl.$^5$ .................................................. B60K 41/06
[52] U.S. Cl. .................................. 74/866; 364/424.1
[58] Field of Search ............... 74/866; 364/424.1; 123/559.1

[56] References Cited

U.S. PATENT DOCUMENTS

| 4,539,868 | 9/1985 | Habu | 74/866 X |
| 4,677,556 | 6/1987 | Habu | 74/866 X |
| 4,939,957 | 7/1990 | Asano et al. | 74/866 |
| 5,003,950 | 4/1991 | Kato et al. | 123/422 |
| 5,107,724 | 4/1992 | Takizawa | 74/866 |

FOREIGN PATENT DOCUMENTS

| 4330329 | 12/1943 | Japan . |
| 60-34563 | 2/1985 | Japan . |
| 60-263754 | 12/1985 | Japan . |
| 61-45160 | 3/1986 | Japan . |
| 62-184934 | 8/1987 | Japan . |
| 1218932 | 9/1989 | Japan . |
| 2-266155 | 10/1990 | Japan . |

Primary Examiner—Richard M. Lorence
Assistant Examiner—Benjamin Levi
Attorney, Agent, or Firm—Oblon, Spivak, McClelland, Maier & Neustadt

[57] ABSTRACT

A shift control apparatus for a vehicle automatic transmission, including: a device for determining whether an intake air quantity (Q/N) per revolution of a vehicle engine exceeds a predetermined threshold; a memory for storing a first and a second shift control data map for shifting a vehicle transmission, the first shift control data map representing first shift boundary lines each representing a relationship between the vehicle speed (SPD) and the intake air quantity, while the second shift control data representing second shift boundary lines each representing a relationship between the vehicle speed and a shift control parameter (TA, PA) which reflects an operation amount of an accelerator pedal; a map switching device for selecting one of the first and second shift control data maps, the map switching device replacing the first shift control data map by the second shift control data map when the intake air quantity exceeds the predetermined threshold; and a device for shifting the transmission, according to the selected first or second shift boundary lines.

28 Claims, 31 Drawing Sheets

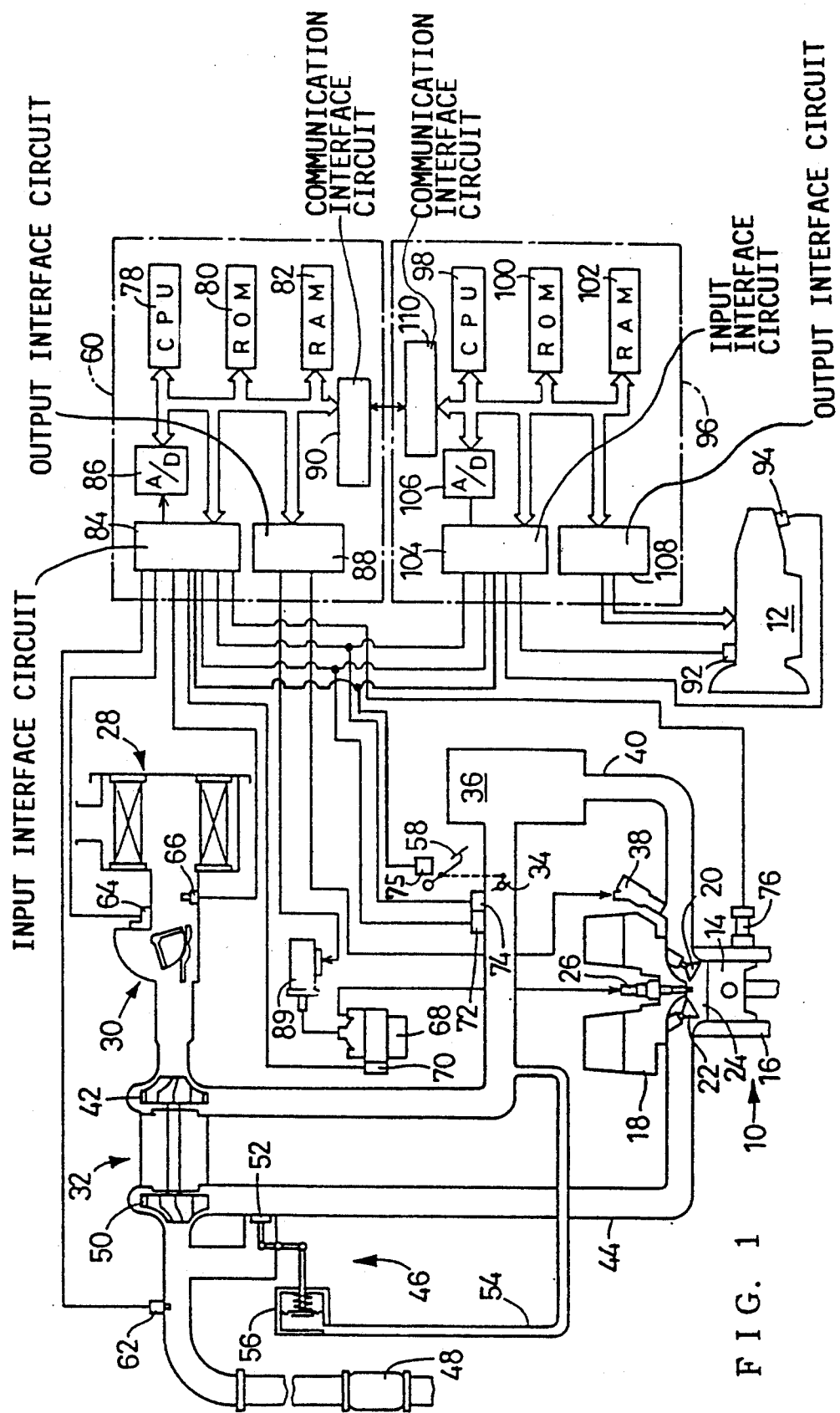
F I G. 1

ENGINE SPEED NE (rpm)

VEHICLE TRANSMISSION SHIFT CONTROL APPARATUS USING SHIFT BOUNDARY LINES BASED ON VEHICLE SPEED, AND ENGINE INTAKE AIR QUANTITY OR THROTTLE OR ACCELERATOR OPERATION AMOUNT

BACKGROUND OF THE INVENTION

1. Field of the Invention

The present invention relates generally to an apparatus for controlling an automatic transmission of a motor vehicle, and more particularly to such an automatic transmission shift control apparatus for selecting an optimum operating position of the automatic transmission, according to shift boundary lines using an intake air quantity per revolution of the vehicle engine.

2. Discussion of the Prior Art

There is known a shift control apparatus for automatically controlling a vehicle automatic transmission, according to shift boundary lines which are represented by stored data maps and each of which represents a relationship between a throttle valve opening TA and the vehicle speed. The determination of whether the transmission is shifted down or up is effected by determining whether a point defined by the currently detected throttle valve opening and vehicle speed is positioned on one or the other side of the shift-down or shift-up boundary line which corresponds to the currently selected position of the transmission. Some modern vehicle engines are equipped with various devices such as a valve timing changing device, a swirl control valve device and an idling speed adjusting device. The operations of these devices may change the engine torque or torque characteristics. If the known shift control apparatus as indicated above is used for such engine, the transmission may be undesirably shifted at a varying drive torque, since the engine torque tends to fluctuate even with the same throttle valve opening. As a result, the transmission may be shifted frequently in a short period of time, or suffer from a considerable torque variation or shock upon shifting actions.

In view of the above drawback, there has been used an electronic shift control apparatus as disclosed in laid-open Publication No. 60-34563 of unexamined Japanese Patent Application. This shift control apparatus uses shift boundary lines each representing a relationship between the vehicle speed, and an intake air quantity Q/N per revolution of the vehicle engine, namely, an intake air quantity Q divided by an engine speed N. These parameters Q and N are detected by respective sensors. Since the intake air quantity Q/N per revolution of the engine (hereinafter referred to simply as "intake air quantity Q/N") accurately represents the engine torque, the transmission can be smoothly shifted, without busy or frequent shifting actions or a shifting shock.

However, the shift control apparatus using the intake air quantity Q/N and the vehicle speed for the shift boundary lines suffer from poor vehicle acceleration smoothness and response to the operation of the accelerator pedal, as felt by the vehicle driver. That is, the intake air quantity Q/N reaches the maximum value, and the engine torque reaches 90% or higher of the maximum value, when the throttle valve opening TA (hereinafter referred to as "throttle opening TA") is increased to a level of about 50–60%. Therefore, the driver's depression of the accelerator pedal to increase the throttle opening TA from that 50–60% level will not result in a considerable increase in the engine torque, whereby the vehicle acceleration as felt by the vehicle driver is bottomed at about 50–60% of the throttle opening.

The vehicle using the shift control apparatus as described above suffers from another problem, where the vehicle engine is provided with a turbocharger, a valve timing changing device or a swirl control valve device. More particularly, the intake air quantity Q/N which reflects the engine torque may increase, without depression of an accelerator pedal or without an increase in the opening of the throttle valve, due to an effect of the turbocharger, for example. As a result, the transmission may be commanded to be shifted down. This shift-down action is unexpected by the vehicle driver, since the driver is not requiring acceleration of the vehicle, i.e., is not depressing the accelerator pedal to increase the throttle opening. Namely, the vehicle driver depresses the accelerator pedal to increase the throttle opening to a given level, and the throttle opening is held constant with the accelerator pedal kept at the same position by the driver. The intake air quantity and the engine torque suddenly rise a considerable time after the depression of the accelerator pedal, due to the effect of the turbocharger. Consequently, the transmission may be shifted down unexpectedly to the vehicle driver, since the vehicle is not in the process of deceleration and the accelerator pedal is held at the same position.

SUMMARY OF THE INVENTION

The present invention was developed in the light of the problems experienced in the prior art discussed above. It is therefore a first object of the present invention to provide a shift control apparatus for an automatic transmission of a motor vehicle, which is capable of shifting the transmission with improved vehicle acceleration smoothness and response to the accelerator pedal operation, over the entire range of the throttle valve opening.

A second object of the invention is to provide a shift control apparatus for a vehicle automatic transmission, which is free from a shift-down operation of the transmission even with an increase in the engine torque, if the vehicle driver is not requiring acceleration of the vehicle and if the vehicle is not in the process of deceleration.

The above first object may be achieved according to a first aspect of the present invention, which provides a shift control apparatus for an automatic transmission of a motor vehicle having an internal combustion engine and an accelerator pedal, comprising: (a) first determining means for determining an intake air quantity (Q/N) per revolution of the engine; (b) second determining means for determining a shift control parameter (TA, PA) which reflects an operation amount of the accelerator pedal; (c) third determining means for determining a running speed (SPD) of the vehicle; (d) fourth determining means for determining whether the intake air quantity exceeds a predetermined threshold; (e) memory means for storing a first and a second shift control data map for shifting the transmission, the first shift control data map representing first shift boundary lines each representing a relationship between the intake air quantity (Q/N) and the speed (SPD) of the vehicle, while the second shift control data representing second shift boundary lines each representing a relationship between the shift control parameter (TA, PA) and the speed of the vehicle; (f) map switching means for selecting one of the first and second shift control data maps, the map switching means replacing the first shift control data map by the second shift control data map when the fourth determining means determines that the intake air quantity exceeds the predetermined threshold; and (g) automatic shift control means for automatically shifting the transmission, on the basis of the speed of the vehicle and the intake air quantity or the shift control parameter, and according to one of the first and second shift boundary lines which is represented by the one of the first and second shift control data maps which is selected by the map switching means.

In the shift control apparatus of the present invention constructed as described above, the first shift boundary lines are used when the intake air quantity is not larger than the predetermined threshold. In this case, therefore, the automatic transmission is shifted based on the vehicle speed and the intake air quantity, according to the first shift boundary lines. Since the intake air quantity represents the torque of the engine, and is substantially proportional to the operation amount of the accelerator pedal while the intake air quantity is not larger than the predetermined threshold value, the transmission can be shifted with excellent response to the change in the operation amount of the accelerator pedal.

When the intake air quantity exceeds the predetermined threshold, on the other hand, the first shift boundary lines which have been used are replaced by the second shift boundary lines each of which represents a relationship between the vehicle speed and the shift control parameter that reflects the operation amount of the accelerator pedal. In this case, the intake air quantity is almost saturated, but the transmission can be shifted with good response to the operation of the accelerator pedal, since the second shift boundary lines used are based on the vehicle speed, and the shift control parameter which reflects the operation amount of the accelerator pedal, rather than the saturated intake air quantity.

Usually, the first shift boundary lines consist of first shift-down boundary lines and first shift-up boundary lines, while the second shift boundary lines consist of second shift-down boundary lines and second shift-up boundary lines. In this case, it is preferable to select the first or second shift-down boundary lines depending upon whether or not the intake air quantity exceeds the predetermined threshold, and always use the first shift-up boundary lines regardless of whether the intake air quantity exceeds the predetermined threshold or not.

According to one preferred arrangement of the present invention, the shift control apparatus further comprises: first boundary determining means for determining a first shift boundary point (SPDqndown, SPDqnup) of the running speed (SPD) of the vehicle, on the basis of a corresponding one of the first shift boundary lines; and second boundary determining means for determining a second shift boundary point (SPDtadown, SPDtaup) of the running speed of the vehicle, on the basis of a corresponding one of the second shift boundary lines. In this arrangement, the map switching means includes judging means for determining that the first shift control data map should be changed to the second shift control data map, when the fourth determining means determines that the intake air quantity exceeds the predetermined threshold, and the automatic shift control means is adapted to effect a determination as to whether or not the transmission is shifted, on the basis of a higher one of the first and second shift boundary points, when the judging means determines that the first shift control data map should be changed to the second shift control data map.

In the above arrangement, the second boundary point is not automatically selected even when the judging means of the map switching means determines that the second shift control data map should be used in place of the first shift control data map. That is, the higher one of the first and second shift boundary point of the vehicle speed is used by the automatic shift control means for determining whether the transmission should be shifted or not. This arrangement is free from otherwise possible sudden reduction of the shift boundary vehicle speed when the intake air quantity exceeds the predetermined threshold. Namely, the shift boundary vehicle speed will smoothly increase with an increase in the intake air quantity or throttle opening even when the intake air quantity exceeds the predetermined threshold, i.e., even if the judging means determines that the second shift control data map should be used. In the event of the above-indicated sudden reduction of the shift boundary vehicle speed (shift boundary point), the newly selected second boundary point for shifting up the transmission tends to be close to the first shift boundary point for shifting down the transmission, for example. The present shift control arrangement which is free from such sudden reduction of the shift boundary point does not suffer from frequent shifting of the transmission, which would arise from the second shift-up boundary point close to the first shift-down boundary point.

In another preferred arrangement of the shift control apparatus according to the first aspect of the invention, the apparatus further comprises fifth determining means for determining that a predetermined running condition of the vehicle is satisfied; and inhibiting means for inhibiting the map switching means from changing one of the first and second shift control data maps to the other of said first and second shift control data maps, until the fifth determining means determines that the predetermined running condition of the vehicle is satisfied.

In the above arrangement, once one of the first and second shift control data maps is selected, the map switching means is inhibited from changing that one shift control data map to the other shift control data map immediately after the map switching means determines that the above-indicated other shift control data map should be used. Namely, the map switching means is inhibited from using that other shift control data map, until the predetermined condition of the vehicle is satisfied. This arrangement prevents otherwise possible successive shifting actions of the transmission upon replacement of a last used one of the first and second shift control data maps to the other. The predetermined running condition of the vehicle is a condition in which the transmission is not shifted due to the changing of the shift control data map. For example, the predetermined running condition that permits the last used shift control data map to be changed to the other shift control data map is a substantially fully closed position of a throttle valve of the engine. When the throttle opening is almost zero, the shift boundary vehicle speeds of the first and second shift control boundary lines represented by the respective first and second data maps are close to each other, and therefore successive shifting actions of the transmission can be avoided. Alternatively, the predetermined running condition of the vehicle may be a non-turbocharging state of a turbocharger of the engine, in which the switching between the first and second shift control data maps takes place while the intake air quantity is comparatively highly proportional to the engine speed. In this state, therefore, the transmission is unlikely to be shifted down, and does not suffer from unnecessary successive shifting actions in a short period of time, which would occur due to the so-called turbocharger lag, upon changing of the shift control data map when the accelerator pedal is depressed.

In a further preferred arrangement of the shift control apparatus, the first shift boundary lines include shift-up boundary lines, while the second shift boundary lines include shift-down boundary lines, and the apparatus further comprises: fifth determining means for effecting a determination that the automatic transmission has been commanded to be shifted down according to one of the shift-down boundary lines of the second shift boundary lines; and inhibiting means for inhibiting the automatic transmission from being shifted up according to one of the shift-up boundary lines of the first shift boundary lines after the determination by the fifth determining means, until a predetermined waiting time ($\beta$) has elapsed after the determination by the fifth determining means.

In the above arrangement, the shift-up action of the transmission according to a shift-up boundary line based on the intake air quantity after the shift-down action according to a shift-down boundary line based on the shift control parameter (e.g., throttle opening) is inhibited until the predetermined waiting time has elapsed after the determination of the shift-down action. Accordingly, the present arrangement is also capable of eliminating the drawback discussed above, that is, successive shift-down and shift-up actions of the transmission in a short period of time, which would occur due to the so-called turbocharger lag, for example, upon changing of the shift control data map when the accelerator pedal is depressed.

In a still further preferred arrangement of the shift control apparatus according to the present invention, the first shift boundary lines includes shift-up boundary lines, while the second shift boundary lines includes shift-down boundary lines, and the apparatus further comprising: fifth determining means for effecting a determination that the automatic transmission has been commanded to be shifted down according to one of the shift-down boundary lines of the second shift boundary lines; sixth determining means for determining a rate ($|\Delta TA|$) at which the accelerator pedal is returned toward a non-operated position thereof; and inhibiting means for inhibiting the automatic transmission from being shifted up according to one of the shift-up boundary lines of the first shift boundary lines after the determination by the fifth determining means, until the rate exceeds a predetermined value ($|\alpha|$).

In the above arrangement, the shift-up action of the transmission based on the intake air quantity after the shift-down action based on the shift control parameter (e.g., throttle opening) is allowed if the accelerator pedal is returned toward the non-operated position, at a rate higher than the predetermined threshold $|\alpha|$. This shift-up action of the transmission after the return speed of the accelerator pedal has exceeded the predetermined threshold does not give the vehicle driver an impression of an unexpected shifting of the transmission, because the vehicle driver has an intention to decelerate the vehicle, which is expressed by the pedal return speed.

The second object indicated above may be achieved according to another aspect of the present invention, which provides a shift control apparatus for an automatic transmission of a motor vehicle wherein shift boundary speeds of the vehicle are determined according to shift boundary lines each representing a relationship between a running speed of the vehicle and an intake air quantity per revolution of an internal combustion engine, the transmission being shifted when the running speed of the vehicle rises above or falls below each one of the shift boundary speeds, the apparatus comprising: (a) first determining means for effecting a first determination that a vehicle driver is requiring running of the vehicle at a constant speed or deceleration of the vehicle; (b) second determining means for effecting a second determination that the running speed (SPD) of the vehicle is held constant or increasing; (c) third determining means for effecting a third determination that the intake air quantity (Q/N) is increasing; and (d) shift control means responsive to the first, second and third determining means, for shifting the automatic transmission according to the shift boundary lines, the shift control means inhibiting a shift-down operation of the automatic transmission upon the first, second and third determinations.

In the shift control apparatus constructed as described above according to the second aspect of this invention, a shift-down operation of the transmission is inhibited even with an increase in the intake air quantity, if the vehicle is requiring a constant-speed running of the vehicle or deceleration of the vehicle and if the vehicle running speed is constant or increasing.

The driver's requirement for the constant-speed running or deceleration of the vehicle means that the driver is not requiring acceleration of the vehicle. Further, an increase in the intake air quantity means an increase in the output torque of the engine. Therefore, an increase in the engine output torque in the absence of the driver's requirement for acceleration of the vehicle while the vehicle is not in the process of deceleration is considered to be derived from the effect of a turbocharger, a valve timing changing device, a swirl control valve device or the like, which may cause an increase in the intake air quantity without depression of the accelerator pedal or an increase in the throttle opening. In this case, the transmission is inhibited from being shifted down even with an increase in the intake air quantity, since this shift-down action is unexpected to the vehicle driver, who is not desiring acceleration of the vehicle.

BRIEF DESCRIPTION OF THE DRAWINGS

The above and optional objects, features and advantages of the present invention will be become more apparent by reading the following detailed description of presently preferred embodiments of the invention, when considered in conjunction with the accompanying drawings, in which:

FIG. 1 is a schematic view showing an internal combustion engine, an automatic transmission and related components of a motor vehicle, and a control system for controlling the engine and the automatic transmission, the control system incorporating one embodiment of a shift control apparatus of the present invention;

DETAILED DESCRIPTION OF THE PREFERRED EMBODIMENTS

Figure 2:
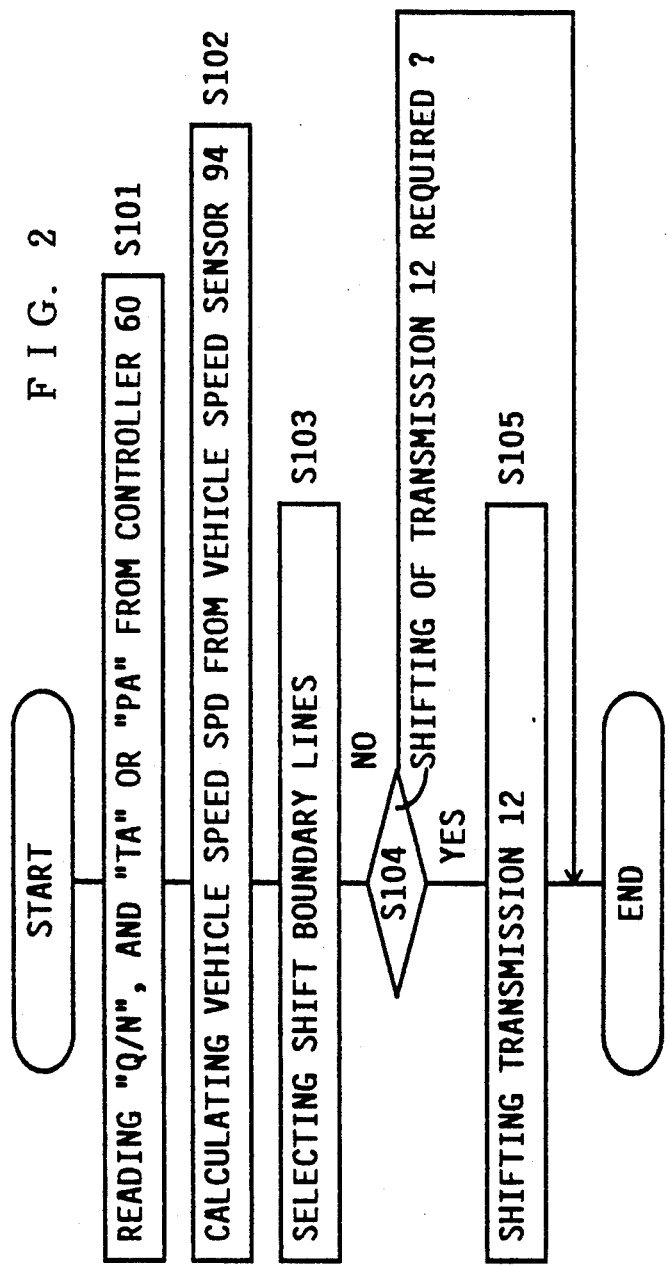
FIG. 2 is a flow chart illustrating a shift control routine implemented by the shift control apparatus of FIG. 1.

Referring first to FIG. 1, there is schematically shown a part of a motor vehicle, including an automatic transmission 12, an engine assembly with an internal combustion engine 10, and a control system for controlling the transmission and engine 12, 10. The engine 10 is a 6-cylinder spark-ignition type engine equipped with a turbocharger. The control system incorporates a shift control apparatus for controlling the transmission 12, which is constructed according to one embodiment of the present invention as described below.

The automatic transmission 12 is a planetary gear type transmission, which has a plurality of hydraulically operated frictional coupling devices, which are suitably controlled by solenoid valves, so as to selectively establish one of a plurality of forward-drive positions, or a reverse-drive position, as disclosed in laid-open Publication No. 60-34577 (published in 1985) of unexamined Japanese Patent Application.

The engine 10 includes a cylinder block 16 having six bores. In each cylinder bore, there is slidably received a piston 14. The open end of the cylinder bore is closed by a cylinder head 18. The piston 14, cylinder block 16 and cylinder head 18 cooperate to define a combustion chamber 24 to which an intake valve 20 and an exhaust valve 22 are exposed. An air-fuel mixture within the combustion chamber 24 is ignited by a spark plug 26.

The engine assembly includes an air cleaner 28, an air flow meter 30, a turbocharger 32, a throttle valve 34, a surge tank 36, and an intake manifold 40, which are arranged in the order of description, in the direction from the air cleaner 28 toward the engine 10, so that air from the air cleaner 28 flows into the engine 10. The intake manifold 40 has a fuel injector valve 38 communicating with its interior. More specifically, the intake air admitted through the air cleaner 28 is compressed by a compressor wheel 42 of the turbocharger 32, and the compressed air is mixed with a fuel injected by the fuel injector valve 38, within the intake manifold 40. The air-fuel mixture is introduced into the combustion chamber 24. The combustion chamber 24 of the engine 10 communicates with an exhaust manifold 44, which in turn communicates with the turbocharger 32, an exhaust waste valve device 46, and a catalytic converter 48. An exhaust emission discharged from the combustion chamber 24 is fed to the turbocharger 32, so as to rotate a turbine wheel 50 of the turbocharger 32. The exhaust emission is purified by the catalytic converter 48.

The exhaust waste valve device 46 is provided for adjusting the pressure of the intake air compressed by the turbocharger 32. The device 46 includes a waste gate valve 52 for closing and opening a by-pass passage which by-passes the turbine wheel 50 of the turbocharger 32. The device 46 further includes an actuator 56 for controlling the waste gate valve 52, depending upon the air pressure compressed by the compressor wheel 42, which pressure is applied to the actuator via a passage 54. The waste gate valve 52 is held closed until the compressed air pressure exceeds a predetermined upper limit. When the compressed air pressure exceeds the upper limit, the waste gate valve 52 is opened so as to prevent a rise of the compressed air pressure beyond the upper limit. The throttle valve 34 is operatively linked with an accelerator pedal 58 through a cable or other suitable connecting means, as well known in the art.

The control system includes an electronic engine controller 60 which receives signals from various sensors including: oxygen sensor 62 exposed to a portion of the exhaust passage downstream of the turbine wheel 50, for generating an output signal indicative of the oxygen concentration of the exhaust emission; intake air sensor 64 provided on the air flow meter 30, for generating an output signal indicative of an intake air amount Q; air temperature sensor 66 exposed to a portion of the intake passage between the air cleaner 28 and the air flow meter 30, for generating an output signal indicative of a temperature Ta of the intake air; engine speed sensor 70 provided on a distributor 68, for generating an output signal indicative of a speed NE of the engine 10 (hereinafter referred to as "engine speed NE"); idle position switch 72 disposed adjacent to the throttle valve 34, for generating an ENGINE IDLE signal indicating that the throttle valve 34 is in the ENGINE IDLE or fully closed position; throttle sensor 74 disposed adjacent to the throttle valve 34, for generating an output signal indicative of the opening TA of the throttle valve 34 (hereinafter referred to as "throttle opening TA"); accelerator sensor 75 disposed adjacent to the accelerator pedal 58, for generating an output signal indicative of the operation angle PA of the accelerator pedal 58; and water temperature sensor 76 provided on the cylinder block 16, for generating an output signal indicative of temperature Tw of a coolant for the engine 10. Where the throttle valve 34 is mechanically linked with the accelerator pedal 58 by a cable or wire, the pedal operation angle PA detected by the accelerator sensor 75 is equivalent to the throttle opening TA detected by the throttle sensor 74.

It is noted that either the throttle opening TA or the accelerator operation angle PA can be used as a parameter which reflects an amount of operation of the accelerator pedal 58.

The electronic engine controller 60 includes a central processing unit (CPU) 78, a read-only memory (ROM) 80, a random-access memory (RAM) 82, an input interface circuit 84, an A/D converter 86, and an output interface circuit 88. The CPU 78 operates to process the signals received through the input interface circuit and/or A/D converter 84, 86, according to control programs stored in the ROM 80, so that an ignition timing command and fuel injection commands are applied to an ignitor 89 and the fuel injector valve 38 through the output interface circuit 88. The ignition timing command represents the timing at which the spark plug 26 is energized by a signal from the distributor 68, while the fuel injection commands represent the time and amount of injection of the fuel by the fuel injector valve 38. The engine controller 60 also operates to calculate an intake air quantity Q/N per revolution of the engine 10 (hereinafter referred to simply as "intake air quantity Q/N"), on the basis of the intake air amount Q detected by the intake air sensor 64 and on the engine speed NE detected by the engine speed sensor 70, so that the fuel injecting time (amount) for maintaining the air/fuel ratio of the air-fuel mixture at the stoichiometric level is determined based on the intake air quantity Q/N. The engine controller 60 also functions to control the ignition timing of the spark plug 26 and the idling of the engine 10, as well known in the art. The intake air quantity Q/N calculated by the engine controller 60 is fed to an electronic transmission controller 96 through a communication interface circuit 90.

The transmission controller 96 for controlling the transmission 12 receives output signals from a shift position sensor 92 and a vehicle speed sensor 94, which are disposed on the transmission 12. The output signal of the shift position sensor 92 represents the currently selected or established position of the transmission 12, while the output signal of the vehicle speed sensor 94 represents the output shaft speed of the transmission 12, from which the running speed SPD of the vehicle can be calculated. The transmission controller 96 also receives the ENGINE IDLE signal from the idle position sensor 72, and the signal from the throttle sensor 74, which represents the throttle opening TA.

The transmission controller 96 includes a central processing unit (CPU) 98, a read-only memory (ROM) 100, a random-access memory (RAM) 102, an input interface circuit 104, an A/D converter 106, and an output interface circuit 108. The CPU 98 operates to process the signals received through the input interface circuit 104 and/or the A/D converter 106, according to control programs stored in the ROM 100, for applying shifting commands to the transmission 12 through the output interface circuit 108, and providing the engine controller 60 with various parametric signals, through a communication interface circuit 110.

Referring next to the flow chart of FIG. 2, there will be described a shift control routine which is implemented by the transmission controller 96. Initially, step S101 is executed to read the intake air quantity Q/N, and the throttle opening TA or accelerator operation angle PA, which are fed from the engine controller 60.

Step S101 is followed by step S102 in which the running speed SPD of the vehicle is calculated from the output shaft speed of the transmission 12 which is represented by the output signal of the vehicle speed sensor 94. The control flow then goes to step S103 in which the CPU 98 selects shift-down and shift-up boundary lines corresponding to the currently selected position of the transmission 12. The shift boundary lines are represented by data maps stored in the ROM 100, and each shift boundary line represents a relationship between the vehicle speed SPD and the intake air quantity Q/N or the throttle opening TA (or accelerator operation angle PA). It is noted that the shift boundary lines representing the relationship between the vehicle speed SPD and the intake air quantity Q/N are referred to as first shift boundary lines, while those representing the relationship between the vehicle speed SPD and the throttle opening TA (accelerator operation angle PA) are referred to as second shift boundary lines.

Step S103 is followed by step S104 in which the CPU 98 determines whether the transmission 12 should be shifted. This determination is effected according to the shift-down and shift-up boundary lines selected in step S103, and on the basis of the vehicle speed SPD and the intake air quantity Q/N or throttle opening TA. If a negative decision (NO) is obtained in step S104, one cycle of execution of the shift control routine of FIG. 2 is completed, and the control flow goes back to step S101 for executing the next cycle. If an affirmative decision (YES) is obtained, step S105 is executed to shift down or up the transmission 12, as required according to the shift-down and shift-up boundary lines.

Steps S103, S104 and S105 will be described in detail, by reference to the flow chart of FIGS. 3 and 4.

Figure 5:
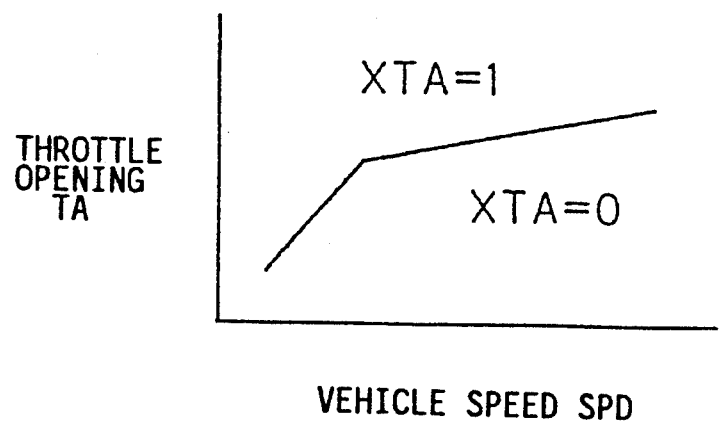
FIG. 5 is a graph for explaining a Q/N-TA flag used in the shift control routine of FIGS. 2–4.

Initially, steps S201 and S202 are executed to read in the intake air quantity Q/N and the throttle opening TA. Then, step S203 is executed to set or reset a Q/N-TA selector flag XTA, on the basis of the throttle opening TA and the vehicle speed SPD (calculated in step S102), and according to a data map stored in the ROM 100. This data map represents a relationship among the throttle opening TA, vehicle speed SPD, and XTA value (1 or 0), as shown in FIG. 5. The flag XTA is set to "1" when the throttle opening TA is relatively large, while the flag is set to "0" when the throttle opening TA is relatively low.

Described in more detail, the upper limit of the throttle opening TA above which the flag XTA is "1" increases with the vehicle speed SPD. This upper limit of the throttle opening TA corresponds to a value of the intake air quantity Q/N, which value is close to but lower than the upper limit of the quantity Q/N. In the zone in which the flag XTA is equal to "1", the intake air quantity Q/N is close to the maximum value, and the torque of the engine 10 is 90% or higher of the maximum value, whereby the engine torque will increase at a considerably low rate even if the accelerator pedal 58 is further depressed.

Step S203 is followed by step S204 to detect the currently selected operating position of the automatic transmission 12, based on the output signal from the shift position sensor 92. Then, step S205 is implemented to select one of shift-up boundary lines which corresponds to the current position of the transmission 12, namely, select the shift-up boundary line for shifting up the transmission 12 from the current position. The shift-up boundary lines are represented by a data map stored in the ROM 100. Each shift-up boundary line represents a relationship between the vehicle speed SPD and the intake air quantity Q/N. Then, step S206 is implemented to determine whether the selected shift-up boundary line is located on the higher side of the currently detected vehicle speed SPD, or not. If the shift-up boundary line is on the higher side of the vehicle speed SPD, step S206 is followed by step S207 in which a shift-down boundary line QNSPD for shifting the transmission 12 from the current position is selected. A data map representing the shift-down boundary lines QNSPD is also stored in the ROM 100. If the shift-up boundary line is on the lower side of the vehicle speed SPD, step S206 is followed by step S208 (FIG. 4) in which the transmission controller 96 commands the transmission 12 to be shifted up to the next high-gear position, and one cycle of execution of the routine of FIGS. 3 and 4 (shift control routine of FIG. 2) is completed. The control flow goes back to step S201 for executing the next cycle.

Figure 3:
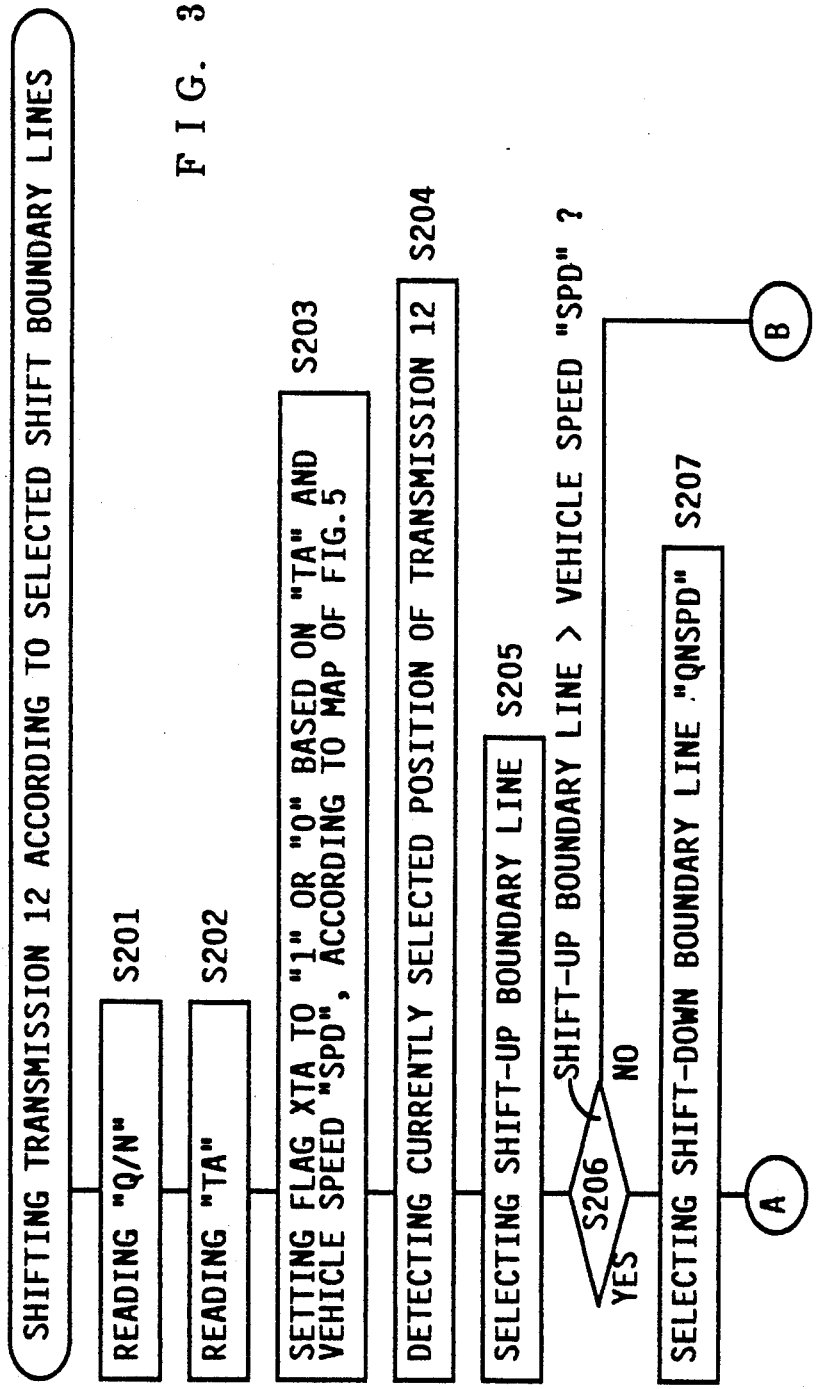
FIGS. 3 and 4 are a flow chart showing in detail steps S103 and S105 in the shift control routine of FIG. 2, for selecting shift boundary lines and shifting the transmission to the selected shift boundary lines.
Figure 4:
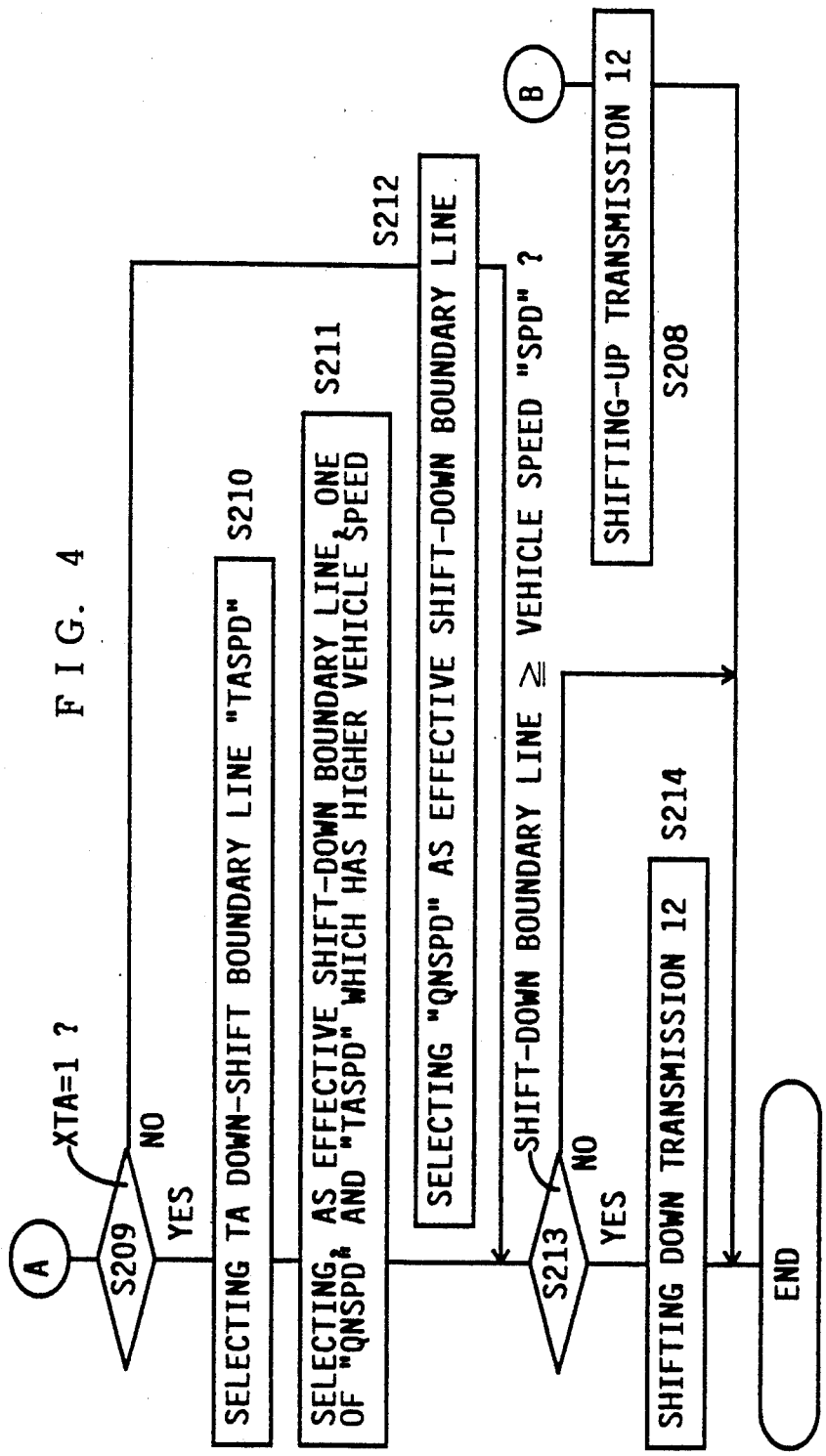
Figure 6:
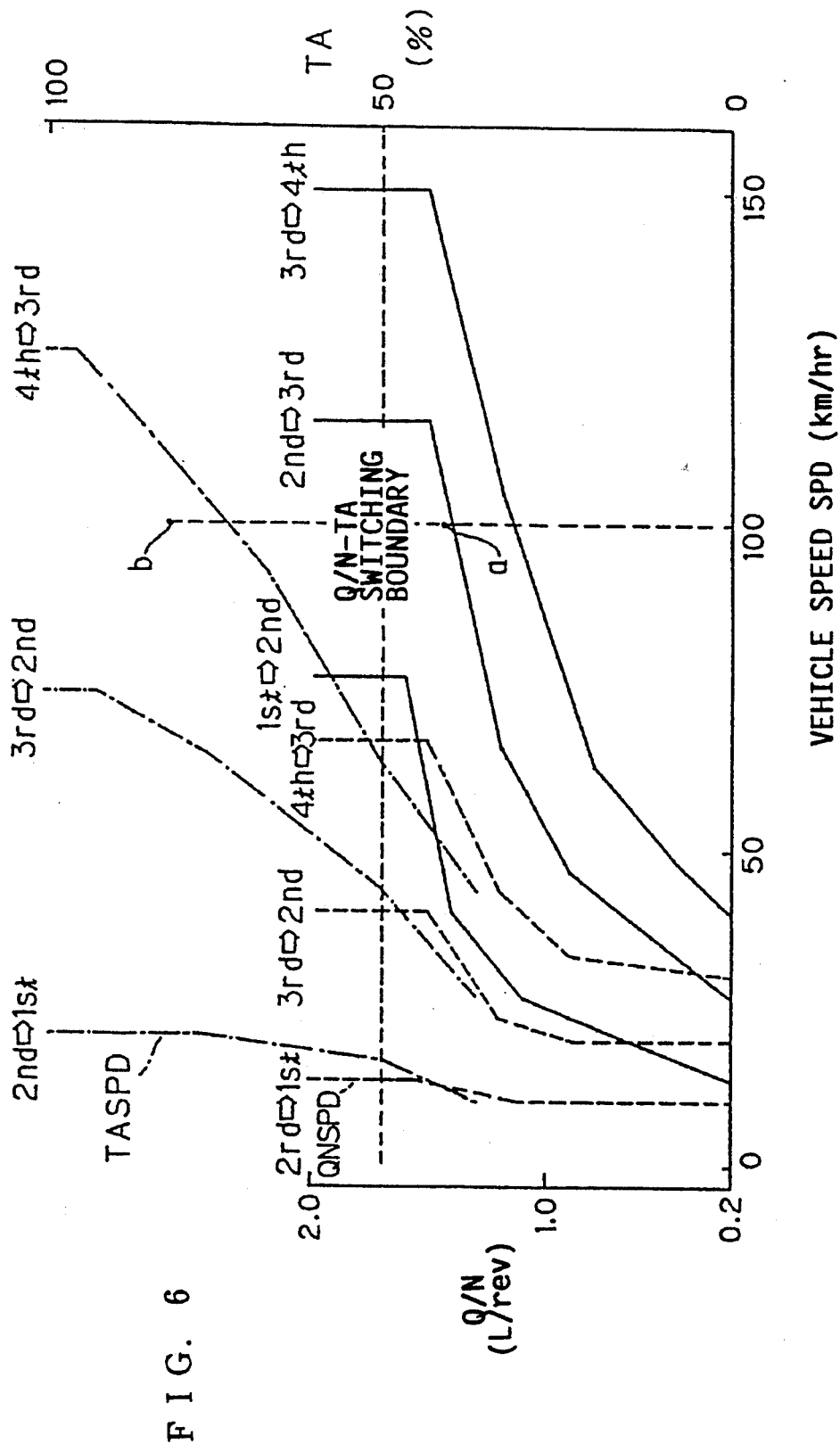
FIG. 6 is a graph explaining shift boundary lines stored in transmission controller and used in the shift control routine, for shifting the transmission.

The graph of FIG. 6 shows an example of a transmission shift control pattern consisting of a plurality of shift-up and shift-down boundary lines, which are selected in the routine of FIGS. 3 and 4. In the graph, the shift-up boundary lines as selected in step S205 are indicated in solid lines, while the shift-down boundary lines QNSPD as selected in step S207 are indicated in dashed lines.

Step S207 is followed by step S209 to determine whether the Q/N-TA selector flag XTA is set at "1" or not. If the flag XTA is set at "1", step S210 is implemented to select one of shift-down boundary lines TASPD which corresponds to the currently selected position of the transmission 12, namely, select the shift-down boundary line for shifting down the transmission 12 from the current position. The shift-down boundary lines are represented by a data map also stored in the ROM 100. Each shift-down boundary line represents a relationship between the vehicle speed SPD and the throttle opening TA. Step S211 is then implemented to compare the two shift-down boundary lines QNSPD and TASPD, and select as the effective shift-down boundary line one of these two lines QNSPD, TASPD which has a higher vehicle speed (which is to the right of the other one as seen in the graph of FIG. 6). In the graph of FIG. 6, the shift-down boundary lines TASPD are indicated in one-dot chain lines. If the flag XTA is set at "0", step S209 is followed by step S212 in which the shift-down boundary line QNSPD is selected as the effective shift-down boundary line.

The selection of the first shift-down boundary line QNSPD or second shift-down boundary line TASPD as the effective shift-down boundary line depends upon the value of the Q/N-TA flag XTA, for the following reason. Namely, the torque of the engine 10 reaches 90% or higher of the maximum torque when the throttle opening TA is 50–60%, in the shift control arrangement in which the shift boundary lines represent the relationship between the intake air quantity Q/N and the vehicle speed SPD. Accordingly, the depression of the accelerator pedal 58 to increase the throttle opening TA to a level higher than 60% for more acceleration of the vehicle will not result in a considerable increase in the engine torque. Thus, the vehicle acceleration is bottomed at about 60% opening TA of the throttle valve 34. In view of this fact, the first shift-down boundary line QNSPD representing the relationship between the intake air quantity Q/N and the vehicle speed SPD is normally used (steps S207 and S212), since the quantity Q/N normally represents the engine torque with relatively high precision. Only when the intake air quantity Q/N is saturated with a relatively high value of the throttle opening TA, the Q/N-TA selector flag XTA is set to "1" (step S203), and the second shift-down boundary line TASPD representing the relationship between the throttle opening TA and the vehicle speed SPD is selected (step S211) as the effective shift-down boundary line if the shift-down boundary line TASPD has a higher vehicle speed than the shift-down boundary line QNSPD.

On the other hand, the shift-up boundary lines representing the relationship between the intake air quantity Q/N and the vehicle speed SPD are always used, even when the throttle opening TA is relatively high. That is, the Q/N-TA selector flag XTA is not used for the shift-up boundary lines. While the throttle opening TA is 50% or higher, the engine torque is 90% or higher of the maximum value, as described above, and the engine torque will not appreciably change even if the shift-up boundary lines representing the relationship between the throttle opening TA and the vehicle speed SPD are used. Further, it is difficult to determine the relationship between the throttle opening TA and the vehicle speed SPD, for the shift-up boundary lines.

The selection of one of the first and second shift-down boundary lines QNSPD and TASPD in step S211 is to give a freedom in effecting the shift-down action of the transmission 12, even if there is some degree of variation in the relationship between the intake air quantity Q/N and the throttle opening TA.

For example, the Q/N-TA selector flag XTA is set to "1" when the throttle opening TA is 50% or higher, as indicated in FIG. 6. In this case, the selection of the first or second shift-down boundary line QNSPD or TASPD as the effective shift-down boundary line depends on whether the currently detected throttle opening TA is higher or lower than the value corresponding to the intersection of these two lines QNSPD and TASPD. For instance, when the transmission 12 is currently placed in the second-speed (2nd) or third-speed (3rd) position, the boundary line TASPD is selected if the current throttle opening TA is higher than 50%. When the fourth-speed (4th) position is currently selected, the boundary line QNSPD is selected if the current throttle opening TA is lower than 50-52%, and the boundary line TASPD is selected if the throttle opening TA is higher than 53%.

Step S211 and S212 in FIG. 4 are followed by step S213 to determine whether the effective shift-down boundary line is located on the higher side of the currently detected vehicle speed SPD, or not. If the effective shift-down boundary line is on the higher side of the current vehicle speed SPD, step S214 is implemented to shift down the transmission 12, and the present cycle of the routine is completed. If the effective shift-down boundary line is not on the higher side of the current vehicle speed SPD, the transmission 12 is not shifted down, and the present cycle of the routine is completed. If the transmission 12 is currently placed in the fourth-speed (4th-speed) position, and the vehicle speed SPD and the intake air quantity Q/N are 100 km/hr. and 1.5 litter/rev. (as indicated at "a" in FIG. 6), respectively, for example, the Q/N-TA selector flag XTA is set at "0", and the 4th→3rd shift-down boundary line QNSPD indicated in dashed line is used as the effective shift-down boundary line. In step S213, therefore, a negative decision (NO) is obtained since the effective shift-down boundary line in question is on the lower side of the vehicle speed 100 km/hr., i.e., located to the left of the point "a". Accordingly, the transmission 12 is not shifted down.

If the vehicle running condition is as indicated at "b" in FIG. 6, namely, acceleration of the vehicle is required with the throttle opening TA set at about 80% while the vehicle is running at 100 km/hr., the 4th→3rd shift-down boundary line TASPD indicated in one-dot chain line is selected in step S210 since the flag XTA is set at "1". Further, this shift-down boundary line TASPD is selected as the effective shift-down boundary line in step S211, since the 4th→3rd shift-down boundary line TASPD is on the higher side of the current vehicle speed 100 km/hr., an affirmative decision (YES) is obtained in step S213, and the transmission 12 is shifted down in step S214, whereby the vehicle is accelerated as required by the vehicle driver.

Figure 7:
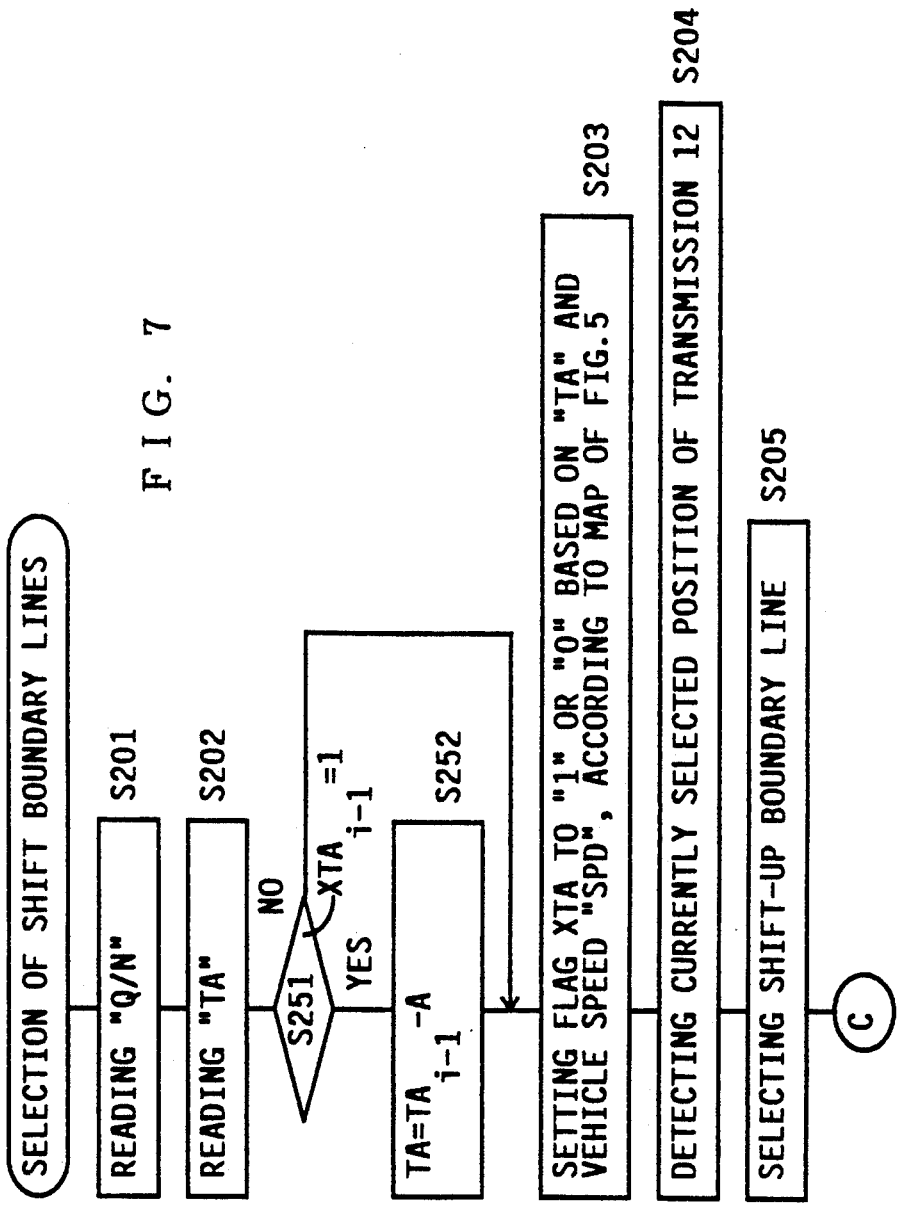
FIGS. 7 and 8 are a flow chart showing a shift control routine alternative to that shown in FIGS. 3 and 4, which is used in a second embodiment of the invention.

Referring next to the flow chart of FIGS. 7 and 8, there will be described a second embodiment of the invention. This embodiment is different from the preceding embodiment of FIGS. 3 and 4, in that steps S251 and S252 are inserted between steps S202 and S203, as shown in FIG. 7. Step S251 following step S202 is provided to determine whether the Q/N-TA selector flag $XTA_{i-1}$ in the last control cycle is equal to "1" or not. The flag XTA is reset to "0" when the engine 10 is started.

If a negative decision (NO) is obtained in step S251, that is, if the flag $XTA_{i-1}$ in the last control cycle is equal to "0", the control flow goes to step S203 to set or reset the flag XTA to "1" or "0", according to the data map of FIG. 5. If an affirmative decision (YES) is obtained in step S251, that is, the flag $XTA_{i-1}$ is equal to "1", step S251 is followed by step S252 in which the throttle opening TA read in step S202 is changed to a value $(TA_{i-1}-A)$, which is equal to the value $TA_{i-1}$ in the last cycle, minus a predetermined suitable value "A". Step S252 is followed by step S203.

In the present second embodiment of the invention, step S203 using the data map of FIG. 5 is executed after the detected throttle opening TA is changed to $(TA_{i-1}-A)$, if the Q/N-TA selector flag $XTA_{i-1}$ in the last cycle is "1" and the second shift-down boundary line TASPD was used in the last cycle. If the flag $XTA_{i-1}$ in the last cycle is "0" and the first shift-down boundary line QNSPD was used in the last cycle, the throttle opening TA detected in step S202 in the present cycle is used in step S203.

Figure 9:
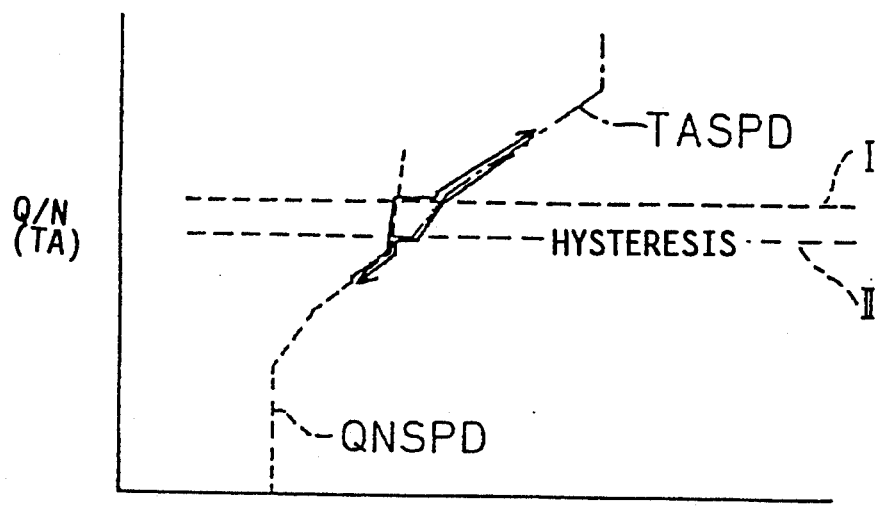
FIG. 9 is a view for explaining switching of effective shift boundary line in the shift control routine of FIGS. 7 and 8.

Accordingly, the first shift-down boundary line QNSPD is changed to or replaced by the second shift-down boundary line TASPD when the intake air quantity Q/N (throttle opening TA) exceeds an upper limit level as indicated by dashed line I in FIG. 9. On the other hand, the second shift-down boundary line TASPD is changed to or replaced by the first shift-down boundary line QNSPD when the intake air quantity Q/N falls below a lower limit level as indicated by dashed line II, which is lower than the upper limit level I. Thus, there is provided a hysteresis in selectively using the first and second shift-down boundary lines QNSPD and TASPD, so that the transmission 12 can be smoothly shifted down even if there is a small amount of discrepancy between the throttle opening TA and the intake air quantity Q/N.

A third embodiment of this invention will be described by reference to FIGS. 10-18. In this embodiment, the throttle opening TA is determined by the operation angle PA of the accelerator pedal 58 and the speed NE of the engine 10, so that the torque of the engine 10 is linearly proportional to the accelerator operation angle PA over the entire range of the engine speed NE.

Figure 10:
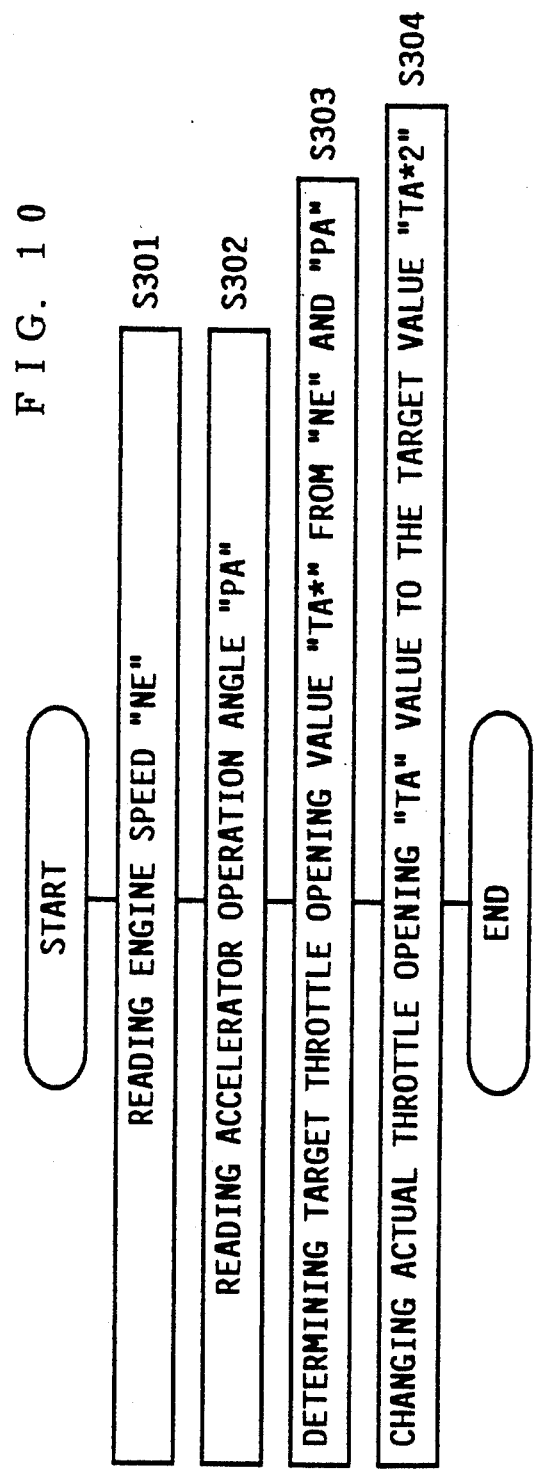
FIG. 10 is a flow chart showing a throttle control routine implemented by engine controller according to a third embodiment of this invention.

In the present third embodiment, the engine controller 60 is adapted to implement a routine as illustrated in FIG. 10. The routine is started with step S301 to read the engine speed NE represented by the output signal of the engine speed sensor 70. Step S301 is followed by step S302 to read the accelerator operation angle PA represented by the output signal of the accelerator sensor 75.

Figure 11:
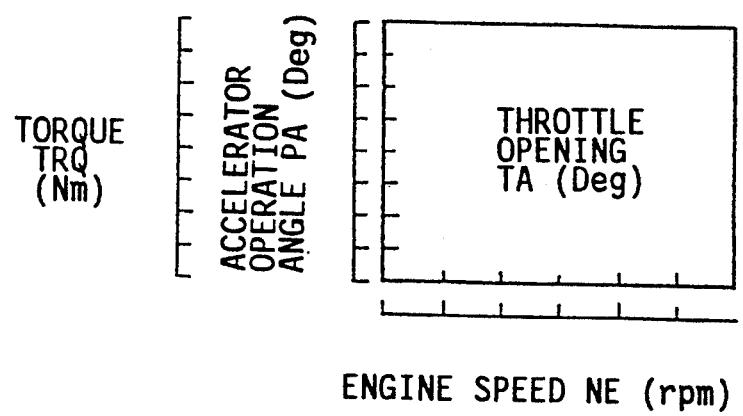
FIG. 11 is a view illustrating a data map used in the routine of FIG. 10.

Then, the control flow goes to step S303 in which a target throttle opening value TA* is determined on the basis of the detected engine speed NE and accelerator operation angle PA, according to a data map stored in the ROM 80, as indicated in FIG. 11. This data map represents a relationship among the engine speed NE, accelerator operation angle PA and target throttle opening value TA*, such that the target throttle opening value TA* changes with the accelerator operation angle PA so that the engine torque TRQ produced at each accelerator operation angle PA is constant over the entire range of the engine speed NE.

Step S303 is followed by step S304 in which the engine controller 60 commands the throttle valve 34 so that the actual throttle opening TA coincides with the determined target throttle opening value TA*. Accordingly, the actual throttle opening TA is controlled as indicated in FIG. 12, such that the actual throttle opening TA changes at the same rate as the accelerator operation angle PA while the throttle opening TA is relatively small, and at a higher rate than the accelerator operation angle PA while the throttle opening TA is relatively large.

Figure 12:
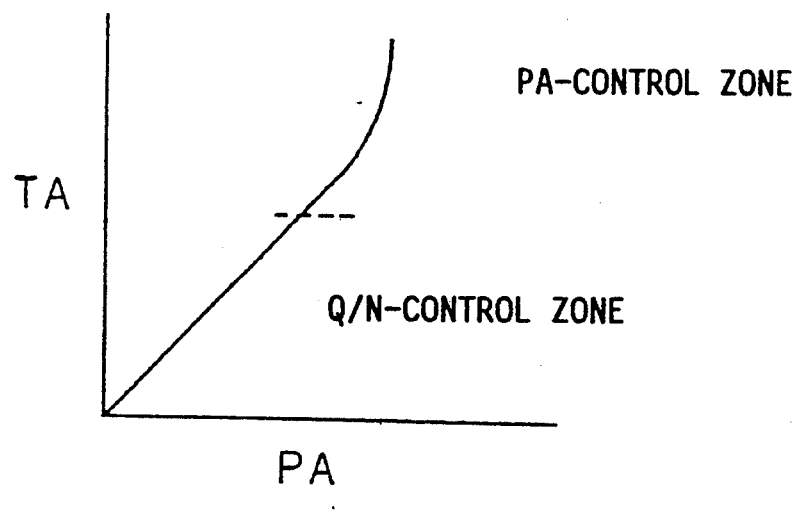
FIG. 12 is a view indicating PA-control zone and Q/N-control zone for shifting the transmission in relation to throttle opening and accelerator operation angles.
Figure 13:
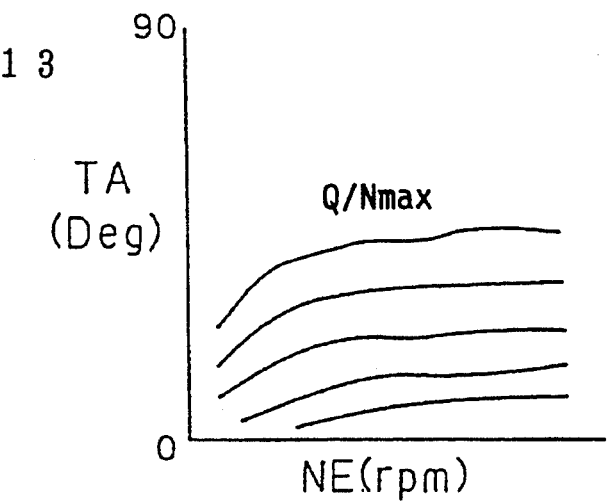
FIG. 13 is graph indicating that the maximum intake air quantity is obtained at about a half of the full throttle opening.

Described more specifically by reference to FIG. 13, the intake air quantity Q/N reaches its maximum level Q/Nmax when the throttle opening TA is 50-60%. That is, the engine torque TRQ will not increase considerably by an increase of the throttle opening TA from that 50-60% level. In view of this fact, the throttle opening TA is controlled to increase at the same rate as the accelerator operation angle PA when the intake air quantity Q/N is smaller than the maximum level Q/Nmax. With the intake air quantity Q/N exceeding the maximum level Q/Nmax, the throttle opening TA is controlled to increase at a higher rate than the accelerator operation angle PA, as indicated by a curve in the graph of FIG. 12. In this control arrangement, the actual engine torque TRQ is linearly proportional to the accelerator operation angle PA.

Figure 14:
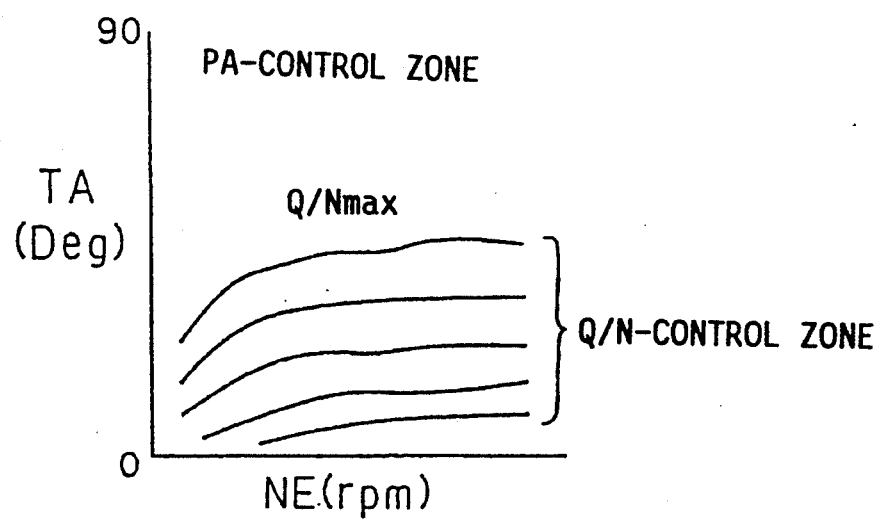
FIG. 14 is a view indicating PA-control and Q/N control zones for shifting the transmission in relation to the throttle opening angle and the engine speed, in the third embodiment of the invention.

In this embodiment, the first shift-down boundary line QNSPD based on the intake air quantity Q/N is used while the engine 10 is operating under a relatively small load, namely, while the throttle opening TA is relatively small and changes at the same rate as the accelerator operation angle PA as indicated by a straight line in FIG. 12, or while the intake air quantity Q/N is smaller than the maximum level Q/Nmax as indicated in FIG. 14. On the other hand, the second shift-down boundary line PASPD based on the accelerator operation angle PA is used while the engine 10 is operating under a relatively large load, namely, while the throttle opening TA is relatively large and changes at a higher rate than the accelerator operation angle PA as indicated by the curve in FIG. 12, or while the intake air quantity Q/N is larger than the maximum level Q/Nmax as indicated in FIG. 14.

Figure 8:
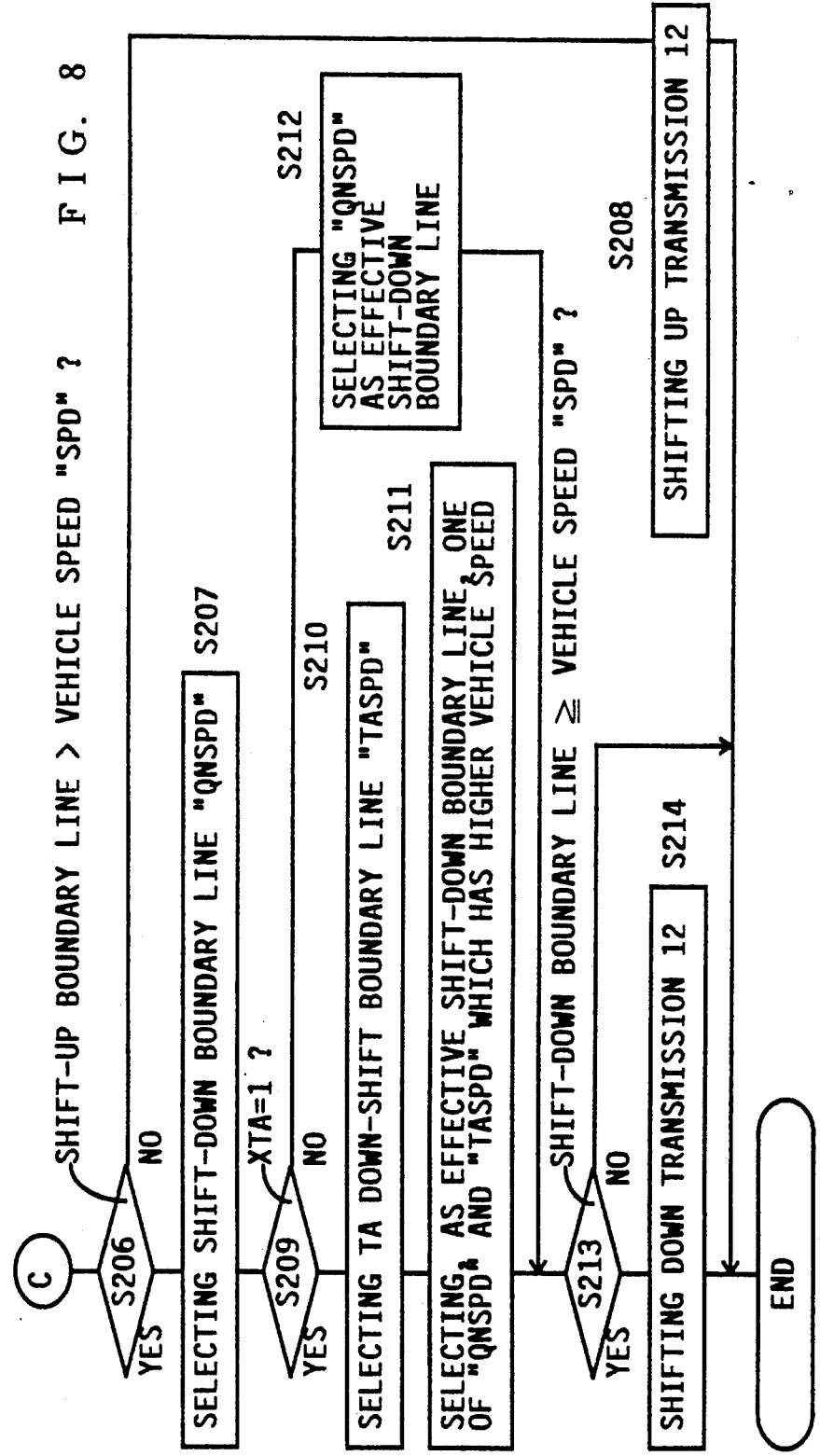
Figure 15:
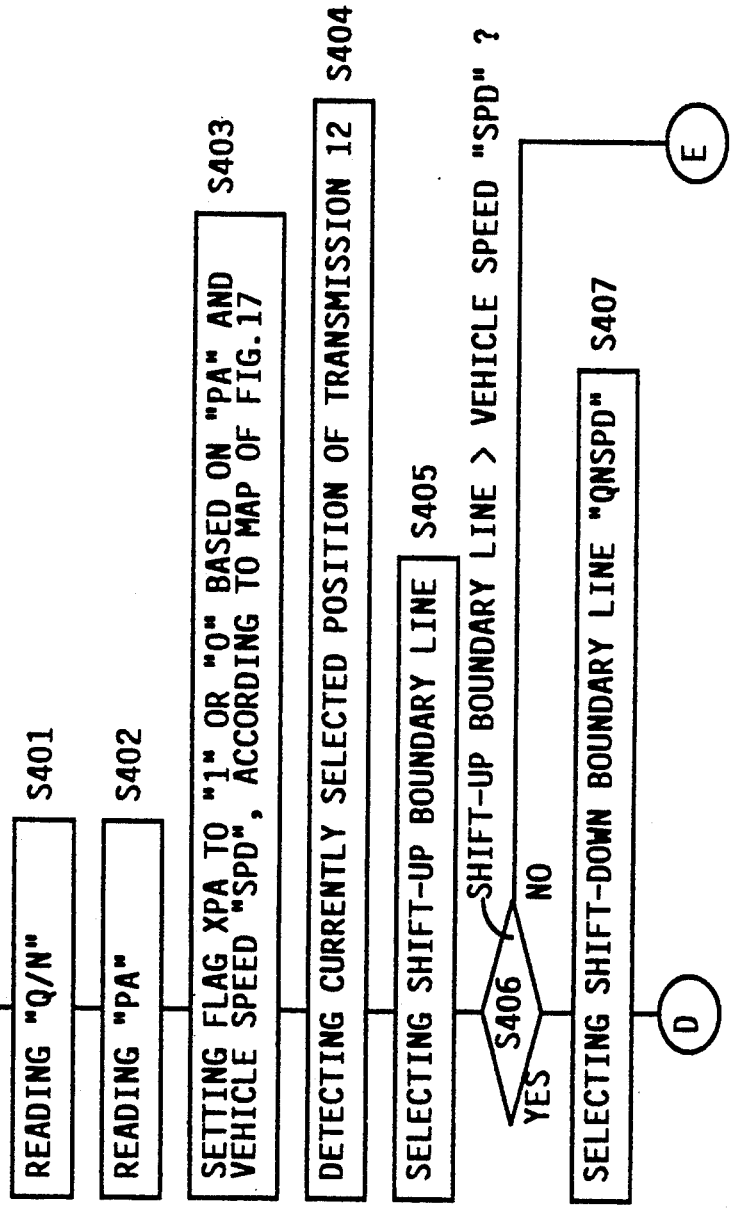
FIGS. 15 and 16 are a flow chart illustrating a shift control routine alternative to the routine of FIGS. 3 and 4, according to the third embodiment of the invention.
Figure 16:
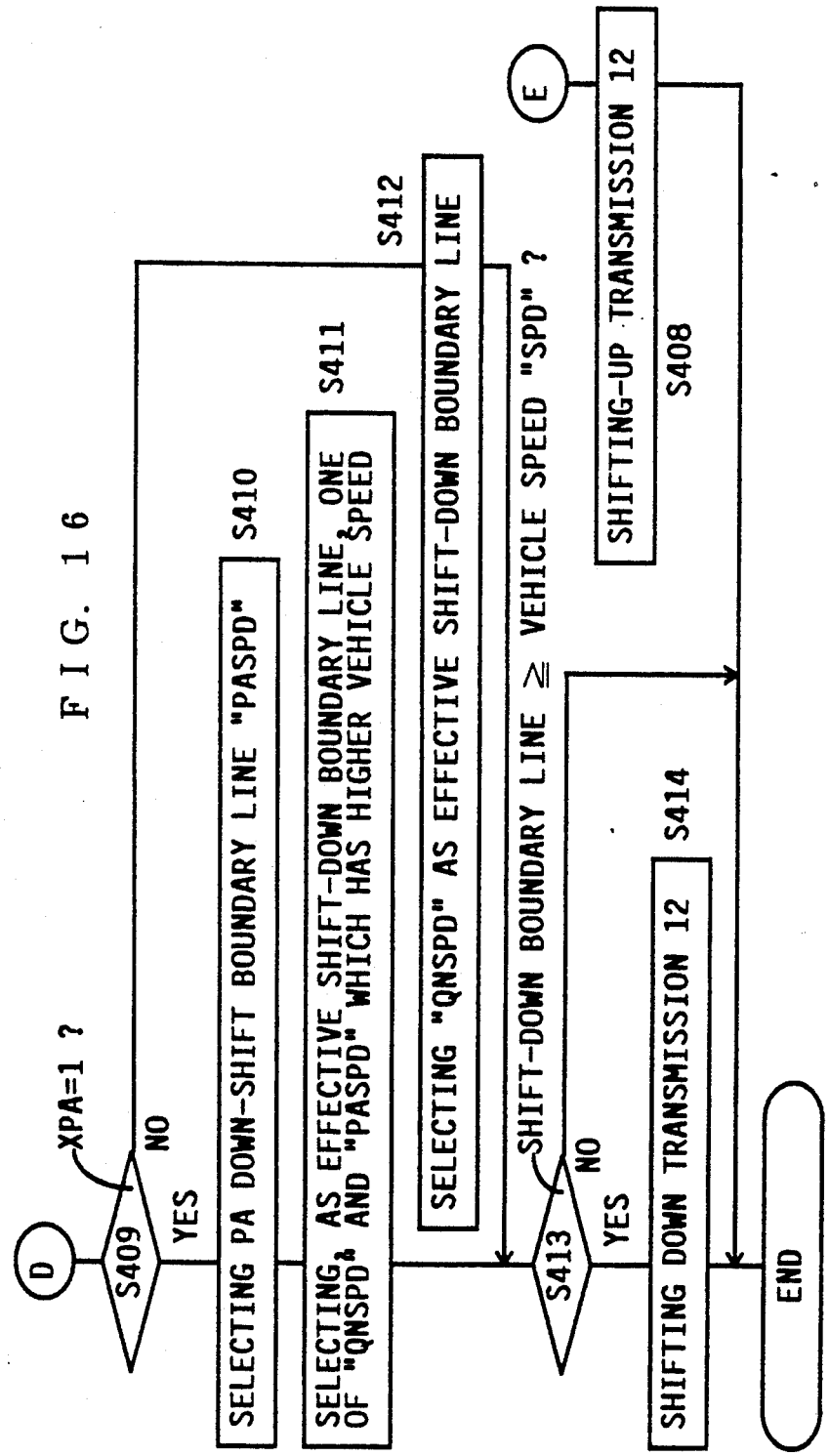
Figure 17:
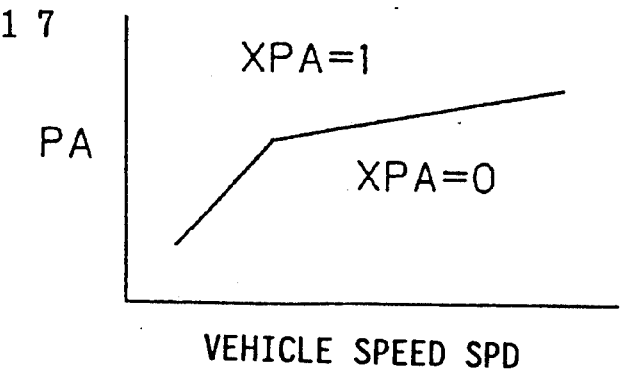
FIG. 17 is a graph for explaining a Q/N-PA flag used in the routine of FIGS. 15 and 16.

A shift control routine used by the transmission controller 96 for shifting the transmission 12 in this third embodiment is illustrated in the flow chart of FIGS. 15 and 16, which corresponds to that of FIGS. 3 and 4 of the first embodiment, and that of FIGS. 7 and 8 of the second embodiment.

Initially, step S401 is executed to read the intake air quantity Q/N. Then, step S402 is executed to read the accelerator operation angle PA. Step S402 is followed by step S403 in which a Q/N-PA selector flag XPA is set to "1" or "0", on the basis of the intake air quantity Q/N and the accelerator operation angle PA, and according to a data map of FIG. 17. This data map represents a relationship among the values PA, SPD and XPA. It will be understood from the graph of FIG. 17, the flat XPA is set to "0" when the accelerator operation angle PA (which corresponds to the throttle opening TA of FIG. 12 or the intake air quantity Q/N of FIG. 14) si relatively small, and set to "1" when the accelerator operation angle PA is relatively large.

Step S403 is followed by step S404 to detect the currently selected operating position of the automatic transmission 12, based on the output signal from the shift position sensor 92. Then, step S405 is implemented to select one of shift-up boundary lines which corresponds to the current position of the transmission 12, namely, select the shift-up boundary line for shifting up the transmission 12 from the current position. The, step S406 is implemented to determine whether the selected shift-up boundary line is located on the higher side of the currently detected vehicle speed SPD, or not. If the shift-up boundary line is one the higher side of the vehicle speed SPD, step S406 is followed by step S407 in which a first shift-down boundary line QNSPD for shifting the transmission 12 from the current position is selected. If the shift-up boundary line is on the lower side of the vehicle speed SPD, step S406 is followed by step S408 (FIG. 16) in which the transmission controller 96 commands the transmission 12 to be shifted up to the next high-gear position, and the present cycle of execution of the routine of FIGS. 15 and 16 is completed. The control flow then goes back to step S401 for the next cycle.

Step S407 is followed by step S409 to determine whether the Q/N-PA selector flag XPA is set at "1" or not. If the flag XPA is set at "1", step S410 is implemented to select one of second shift-down boundary lines PASPD which corresponds to the currently selected position of the transmission 12, namely, select the shift-down boundary line for shifting down the transmission 12 from the current position. Like the second shift-down boundary lines TASPD discussed with respect to step S210 of FIG. 4, the second shift-down boundary lines PASPD are represented by a data map stored in the ROM 100. Each shift-down boundary line PASPD represents a relationship between the vehicle speed SPD, and the accelerator operation angle PA in place of the throttle opening TA used in the data map used in step S210.

Step S411 is then implemented to compare the two shift-down boundary lines QNSPD and PASPD, and select as the effective shift-down boundary line one of these two lines QNSPD, PASPD which has a higher vehicle speed. If the flag XPA is set at "0", step S409 is followed by step S412 in which the first shift-down boundary line QNSPD is selected as the effective shift-down boundary line.

Steps S411 and S412 are followed by step S413 to determine whether the effective shift-down boundary line QNSPD or PASPD is located on the higher side of the currently detected vehicle speed SPD, or not. If the effective shift-down boundary line is located on the higher side of the current vehicle speed, step S414 is implemented to shift down the transmission 12, and the present cycle of the shift control routine is completed. If the effective shift-down boundary line is not on the higher side of the current vehicle speed SPD, the transmission 12 is not shifted down, and the present cycle of the routine is completed.

It will be understood that the present embodiment is adapted such that the second shift-down boundary lines PASPD based on the accelerator operation angle PA are used when the accelerator pedal 58 is depressed to increase the operation angle PA from the level corresponding to the maximum intake air quantity Q/Nmax. This shift control arrangement assures improved vehicle acceleration smoothness and response to an operation of the accelerator pedal 58, as felt by the vehicle driver.

Figure 18:
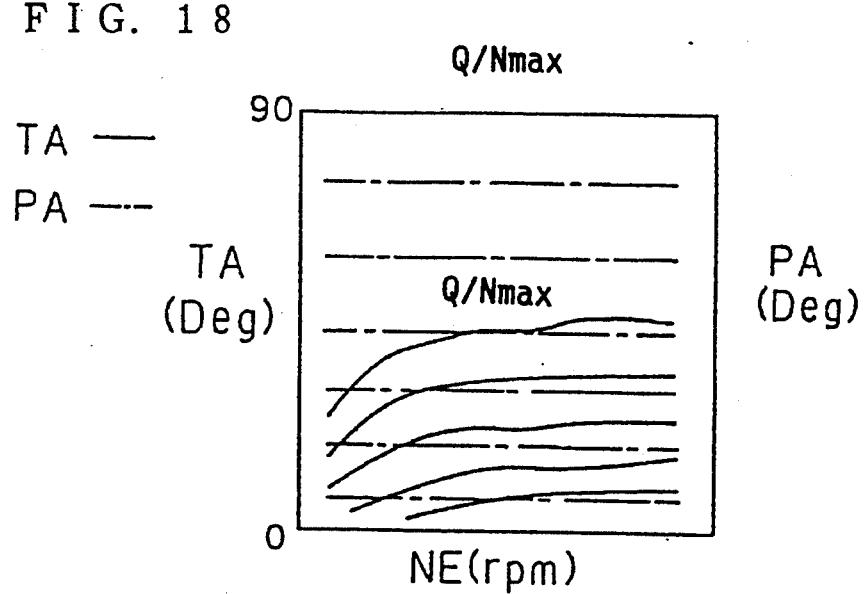
FIG. 18 is a view showing a relationship between the acceleration operation angle and the intake air quantity.

In the present third embodiment, the throttle opening TA is controlled depending upon the actually detected accelerator operation angle PA and engine speed NE, in view of the variation characteristic of the intake air quantity Q/N in relation to the throttle opening TA, so that the engine torque TRQ which is accurately represented by the intake air quantity Q/N is linearly proportional to the actual accelerator operation angle PA over the entire range of the engine speed NE. FIG. 18 shows the relationship among the throttle opening TA, intake air quantity Q/N (Q/Nmax), engine speed NE and accelerator operation angle PA.

While the intake air quantity Q/N per revolution of the engine speed NE is used to determine the shift boundary lines, the intake air quantity Q/N may be replaced by an intake air pressure in the intake pipe, or a fuel injection amount TP which is determined by the intake air quantity or pressure. The fuel injection amount is linearly proportional to the intake air quantity or pressure.

Figure 19:
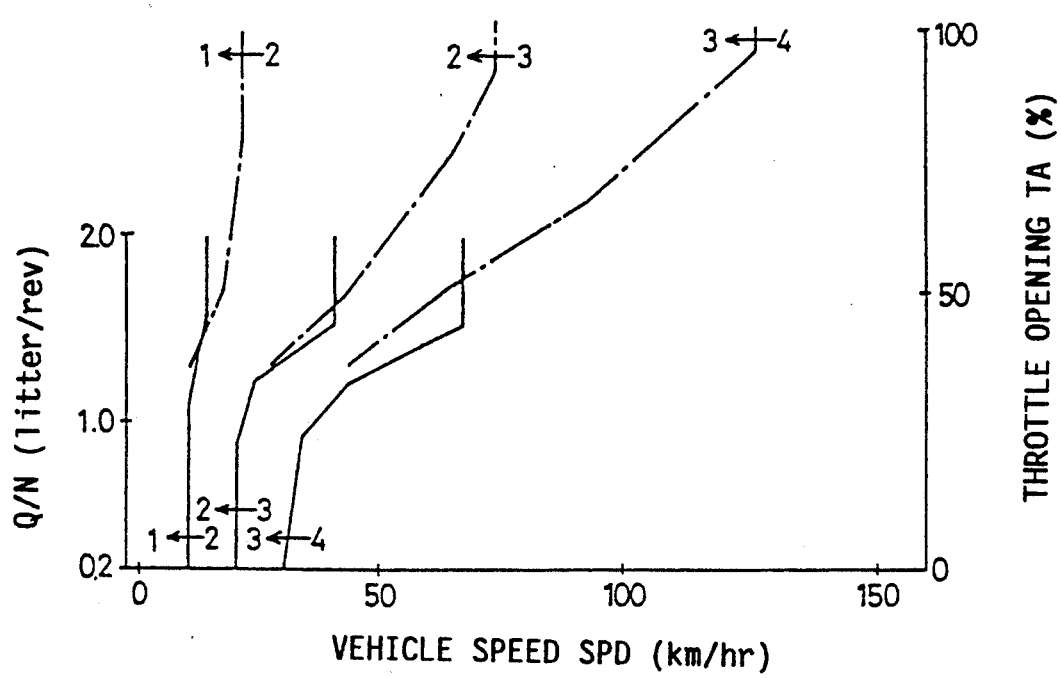
FIG. 19 is a graph showing shift-down boundary lines stored in transmission controller and used for shifting down the transmission, according to a fourth embodiment of the present invention.
Figure 20:
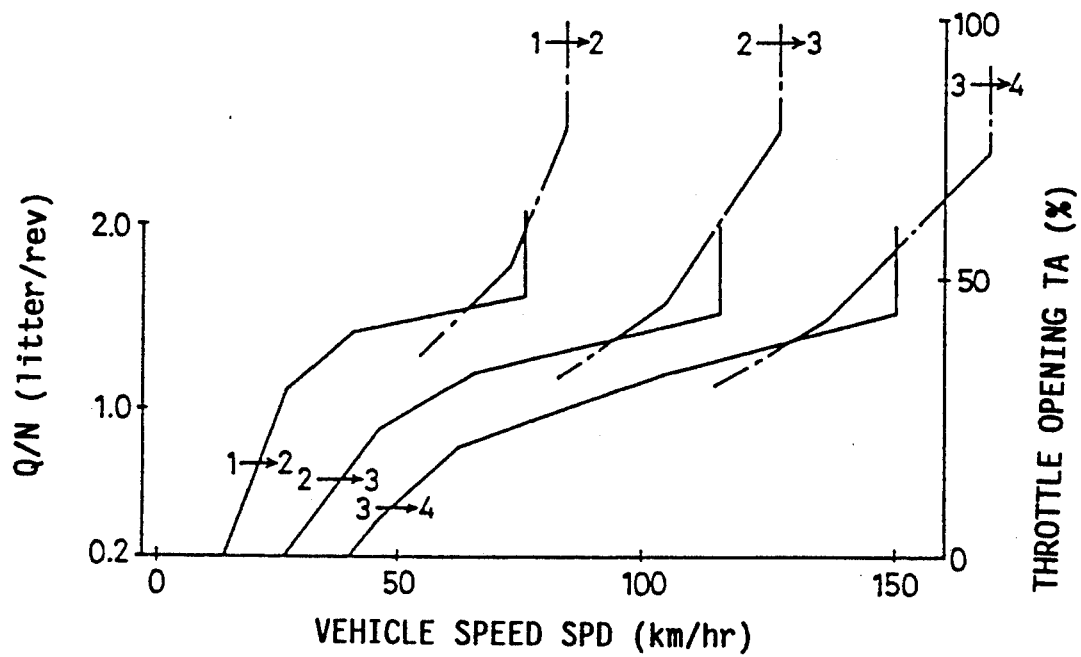
FIG. 20 is a graph showing shift-up boundary lines used in the embodiment of FIG. 19.

Referring next to FIGS. 19-24, there will be described a fourth embodiment of this invention, in which the ROM 100 stores first and second data maps representative of respective first and second shift boundary lines as shown in FIGS. 19 and 20. The first shift-down boundary lines each representing a relationship between the vehicle speed SPD and the intake air quantity Q/N are indicated in solid lines in FIG. 19, while the first shift-up boundary lines each representing a relationship between the vehicle speed SPD and the intake air quantity Q/N are indicated in solid lines in FIG. 20. On the other hand, the second shift-down boundary lines each representing a relationship between the vehicle speed SPD and the throttle opening TA are indicated in one-dot chain lines in FIG. 19, while the second shift-up boundary lines each representing a relationship between the vehicle speed SPD and the throttle opening TA are indicated in one-dot chain lines in FIG. 20.

In the present embodiment, each shift boundary line consists of a plurality of straight segments which are connected end to end. The data maps stored in the ROM 100 represent the points of the ends of these straight segments. When the shift boundary lines are used to determine whether the transmission 12 should be shifted or not, points intermediate between the ends of the appropriate straight segments of the appropriate shift boundary line are calculated by interpolation. The first shift-down and shift-up boundary lines indicated in solid lines in FIGS. 19 and 20 are expressed in a coordinate system in which the vehicle speed SPD is taken along the horizontal axis while the intake air quantity Q/N is taken along the vertical axis on the left side of the figures. The second shift-down and shift-up boundary lines indicated in one-dot chain lines in FIGS. 19 and 20 are expressed in a coordinate system in which the vehicle speed SPD is also taken along the horizontal axis while on the other hand the throttle opening TA is taken along the vertical axis on the right side of the figures.

It is noted that FIGS. 19 and 20 show the relationships between the first and second shift boundary lines where the second shift boundary lines are used when the throttle opening TA exceeds 50%.

A shift control routine in the present fourth embodiment will be described by reference to the flow chart of FIG. 21.

Initially, step S501 is executed to read the throttle opening TA, engine speed NE, intake air amount Q and vehicle speed SPD, and to calculate the intake air quantity Q/N from the intake air amount Q and the engine speed NE. Step S501 is followed by step S502 in which the currently selected position of the automatic transmission 12 is determined based on the output signal from the shift position sensor 92.

The control flow then goes to step S503 to select the first shift-down boundary line and shift-up boundary line (indicated in solid lines in FIGS. 19 and 20) which correspond to the currently selected position of the transmission 12. If the transmission 12 is currently placed in the 2nd-speed position, the CPU 98 selects the first shift-down boundary line for shifting down the transmission 12 from the 2nd-speed position to the 1st-speed position, and the first shift-up boundary line for shifting up the transmission from the 2nd-speed position to the 3rd-speed position. Further, the CPU 98 determines a first or Q/N shift-down boundary speed SPDqndown(2-1), according to the selected first shift-down boundary line and the current intake air quantity Q/N, and further determines a first or Q/N shift-up boundary speed SPDqnup(2-3), according to the selected first shift-up boundary line and the current intake air quantity Q/N.

Figure 22:
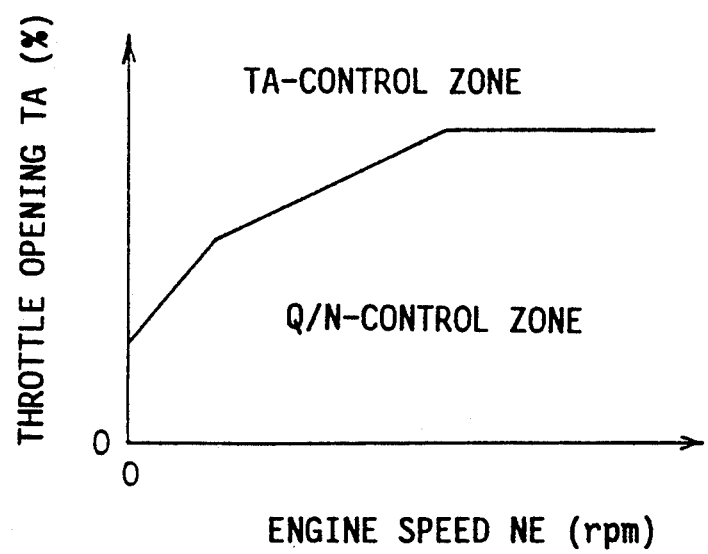
FIG. 22 is a graph indicating TA-control and Q/N-control zones for shifting the transmission in relation to the throttle opening and the engine speed.

Step S503 is followed by step S504 to determine whether or not the current operating condition of the engine 10 is in a TA-control zone in which the second shift boundary lines are used. This determination is effected according to a data map stored in the ROM 100, and on the basis of the current throttle opening TA and engine speed NE which were read in step S501. This data map represents a predetermined relationship between the throttle opening TA and the engine speed NE, as indicated in the graph of FIG. 22. This relationship represents a boundary between the above-indicated -TA-control zone and a Q/N-control zone in which the first shift boundary lines are used. For example, a threshold value of the throttle opening TA is obtained for the current engine speed NE, and a decision is made as to whether the current throttle opening TA is larger or smaller than the threshold value. If the throttle opening TA is larger than the threshold value, the current operating condition of the engine 10 is in the TA-control zone.

If a negative decision (NO) is obtained in step S504, namely, if the current engine operating condition is in the Q/N-control zone, step S505 is executed to select the first shift-down and shift-up boundary lines, that is, the Q/N shift-down and shift-up boundary speeds SPDqndown(2-1) and SPDqnup(2-3) which were determined in step S503. Step S505 is followed by step S509 in which the shifting of the transmission 12 (currently placed in the 2nd-speed position) is effected according to the Q/N shift-down and shift-up boundary speeds SPDqndown(2-1) and SPDqnup(2-3). The transmission controller 96 commands the transmission 12 to be shifted up to the 3rd-speed position if the current vehicle speed SPD is higher than the Q/N shift-up boundary speed SPDqnup(2-3), or commands the transmission 12 to be shifted down to the 1st-speed position if the current vehicle speed SPD is lower than the Q/N shift-down boundary speed SPDqndown(2-1). If the vehicle speed SPD is between the Q/N shift-down and shift-up boundary speeds SPDqndown(2-1) and SPDqnup(2-3), no shifting command is generated by the transmission controller 96, whereby the transmission 12 remains in the 2nd-speed position.

If an affirmative decision (YES) is obtained in step S504, the control flow goes to step S506, in which the transmission controller 96 selects the second shift-down and shift-up boundary lines (indicated in one-dot chain lines in FIGS. 19 and 20) which correspond to the current position of the transmission 12, and determine second or TA shift-down and shift-up boundary speeds according to the selected second shift-down and shift-up boundary lines and the current throttle opening TA (or the current vehicle speed SPD). If the transmission 12 is currently placed in the 2nd-speed position, for example, the TA shift-down boundary speed SPDtadown(2-1) and the TA shift-up boundary speed SPDtaup(2-3) are determined. Then, step S507 is executed to determine whether or not the second or TA shift-down boundary speed SPDtadown(2-1) obtained in step S506 is equal to or higher than the first or QN shift-down boundary speed SPDqndown(2-1) obtained in step S503, and determine whether or not the second TA shift-up boundary speed SPDtaup(2-3) obtained in step S506 is equal to or higher than the first or QN shift-up boundary speed SPDqnup(2-3) obtained in step S503. If the TA shift-down and shift-up boundary speeds SPDtadown(2-1) and SPDtaup(2-3) are both equal to or higher than the corresponding QN shift-down and shift-up boundary speeds SPDqndown(2-1)- and SPDqnup(2-3), step S507 is followed by step S508, in which the TA shift-down boundary speeds SPDtadown(2-1) and SPDtaup(2-3) are selected, and the shifting of the transmission 12 is controlled in step S509 according to the selected TA shift-down and shift-up boundary speeds.

If the QN shift-down boundary speed SPDqndown(2-1) and/or QN shift-up boundary speed SPDqnup(2-3) is/are higher than the corresponding TA shift-down boundary speed SPDtadown(2-1) and/or TA shift-up boundary speed SPDtaup(2-3), the QN shift-down boundary speed SPDqndown(2-1) and/or QN shift-up boundary speed SPDqnup(2-3) is/are selected in step S505. Namely, steps S507, S505 and S508 are provided to select a higher one of the TA and QN shift-down boundary speeds, and a higher one of the TA and QN shift-up boundary speeds. In the step S509 following steps S505 or S508, the shifting of the transmission 12 is controlled according to the TA and/or QN shift-down and shift-up boundary speeds selected in step S505 and/or step S508.

With steps S501-S509 repeatedly executed, the shifting of the transmission 12 is controlled according to the shift-down and shift-up boundary speeds SPDqndown or SPDqnup and SPDtadown or SPDtaup, which are selected in steps S505 and/or S508. If the affirmative decision (YES) is obtained in step S504 to replace the first shift control data maps (first shift boundary lines) by the second shift control data maps (second shift boundary lines), step S507 is executed to select a higher one of the first and second shift-down boundary speeds, e.g., a higher one of the QN and TA shift-down boundary speeds SPDqndown(2-1) and SPDtadown(2-1), and a higher one of the QN and TA shift-down boundary speeds SPDqnup(2-3) and SPDtaup(2-3). These higher shift-down and shift-up boundary speeds are determined in step S503 and/or step S506 according to the appropriate first data map and/or the second data map, and selected in step S505 and/or step S508 depending upon the result of comparison of the speeds SPD in step S507.

Figure 23:
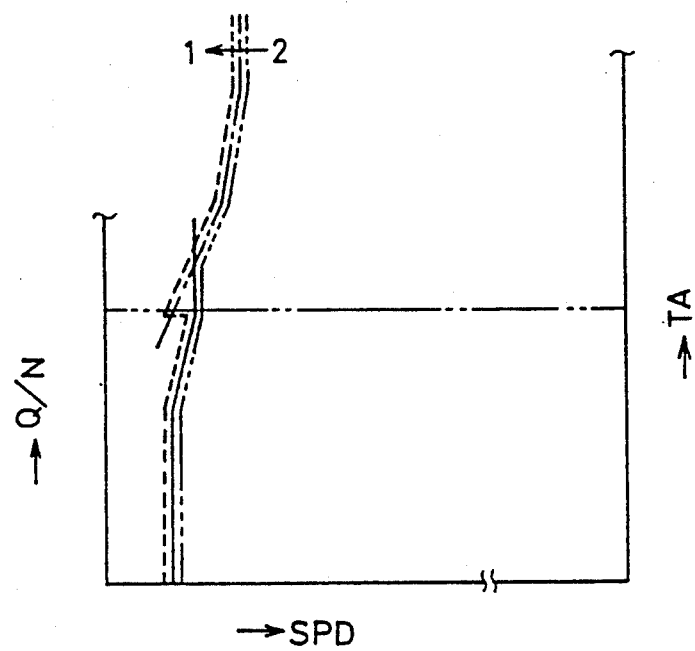
FIG. 23 is a graph for explaining shift-down boundary lines selected in the routine of FIG. 21.
Figure 24:
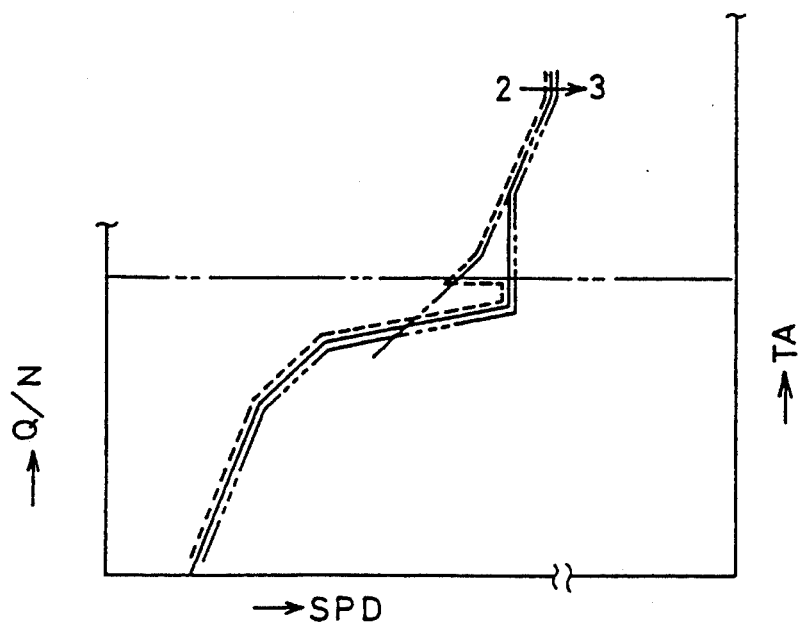
FIG. 24 is a graph for explaining shift-up boundary lines selected in the routine of FIG. 21.

Referring to FIG. 23, solid line and one-dot chain line represent the QN shift-down boundary line and the TA shift-down boundary line, respectively, used for shifting down the transmission 12 from its 2nd-speed position. Suppose the QN shift boundary lines (first shift control data maps) are replaced by the TA shift boundary lines (second shift control data maps), at a threshold value of the throttle opening TA as indicated in two-dot chain line in FIG. 23, the shift-down boundary speed would be suddenly shifted to the lower side at the threshold value as indicated by dashed line, if steps S507, S505 and S508 were not provided. This gives the vehicle driver an impression of strange shifting of the transmission 12. In the present embodiment in which step S507 is provided to select the higher one of the shift-down boundary speeds SPDqndown(2-1) and SPDtadown(2-1) when the current throttle opening TA exceeds the threshold value, the QN shift-down boundary line and the TA shift-down boundary line are smoothly connected as indicated by three-dot chain line in FIG. 23, and the shift-down boundary speed will not be suddenly reduced even if the throttle opening TA exceeds the threshold value indicated in the two-dot chain line. Namely, the shift-down boundary speed will be smoothly changed with a change in the vehicle speed SPD or intake air quantity Q/N. Similarly, solid and one-dot chain lines in FIG. 24 represent the QN and TA shift-up boundary lines for shifting up the transmission 12 from the 2nd-speed position. As indicated by three-dot chain line in FIG. 24, these two shift-up boundary lines are smoothly connected, and the shift-up boundary speed will be smoothly changed with the vehicle speed or intake air quantity Q/N, even if the opening TA exceeds the threshold value indicated in two-dot chain line. If step S507 would not be provided, the shift-up boundary speed would be suddenly reduced as indicated by dashed line, when the throttle opening TA exceeds the threshold vale.

It will be understood that if the operating condition of the engine 10 is in step S504 found to be in the TA-control zone while the transmission 12 is currently placed in the 2nd-speed position, for example, the determination in step S509 as to whether the transmission 12 should be shifted down or up is effected according to the higher one of the first or QN shift-down boundary speed SPDqndown(2-1) and the second or TA shift-down boundary speed SPDtadown(2-1), and the higher one of the first or QN shift-up boundary speed SPDqnup(2-3) and the second or TA shift-up boundary speed SPDtaup(2-3). Accordingly, the shift-down and shift-up boundary speeds will not be suddenly reduced when the throttle opening TA exceeds the predetermined threshold, but will change smoothly with an increase in the intake air quantity Q/N or throttle opening TA. Therefore, the present arrangement is free from an otherwise possible frequent shifting of the transmission 12, which would arise from the second shift-up boundary speed close to the first shift-down boundary speed, for instance, which would in turn arise from the sudden reduction of the shift boundary speeds as described above.

It will also be understood that while step S211 (FIGS. 4 and 8) or S411 (FIG. 16) in the first, second and third embodiments has been briefly described, the step S211, S411 corresponds to steps S507, S505 and S508 of the present fourth embodiment, and step S209, 409 in the preceding embodiments corresponds to step S504 in the present fourth embodiment. However, step S211, S411 is limited to the shift-down boundary lines.

Figure 21:
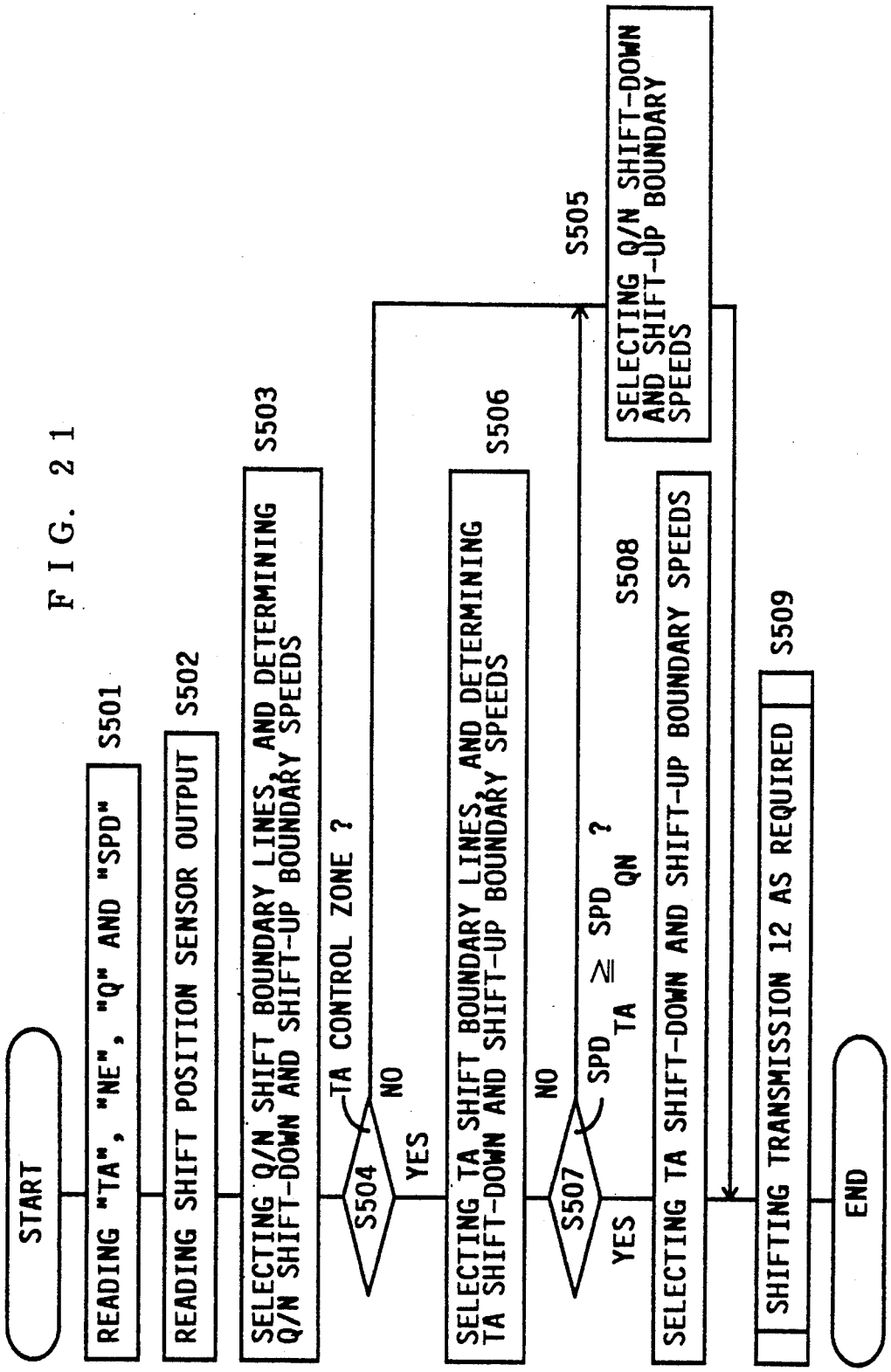
FIG. 21 is a flow chart illustrating a shift control routine implemented in the same embodiment.

While the shift control routine of FIG. 21 including step S507 is applied to all shift boundary lines irrespective of the currently established position of the transmission 12, the application of this routine may be limited to selected ones of the shift boundary lines for example, 2→1 and 3→2 shift-down boundary lines and 2→3 and 3→4 shift-up boundary lines.

In the present embodiment, the determination in step S504 is based on the relationship between the throttle opening TA and the engine speed NE as indicated in FIG. 22, this determination may be effected based on a predetermined threshold value of the throttle opening TA which is constant over the entire range of the engine speed NE.

Further, the engine speed NE taken along the horizontal axis of the data map of FIG. 22 may be replaced by the vehicle speed SPD.

Figure 25:
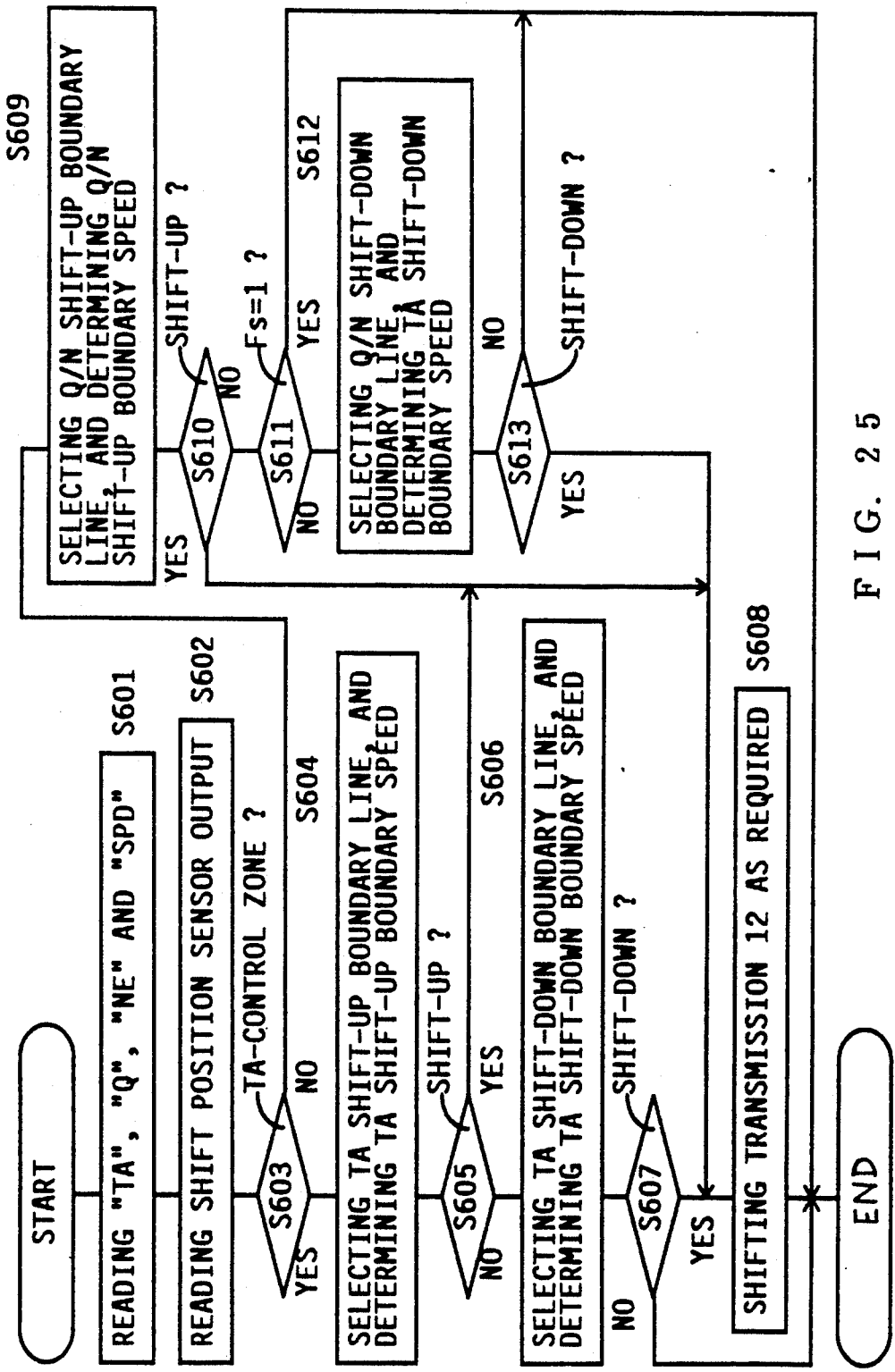
FIG. 25 is a flow chart illustrating a shift control routine used in a fifth embodiment of the present invention.
Figure 26:
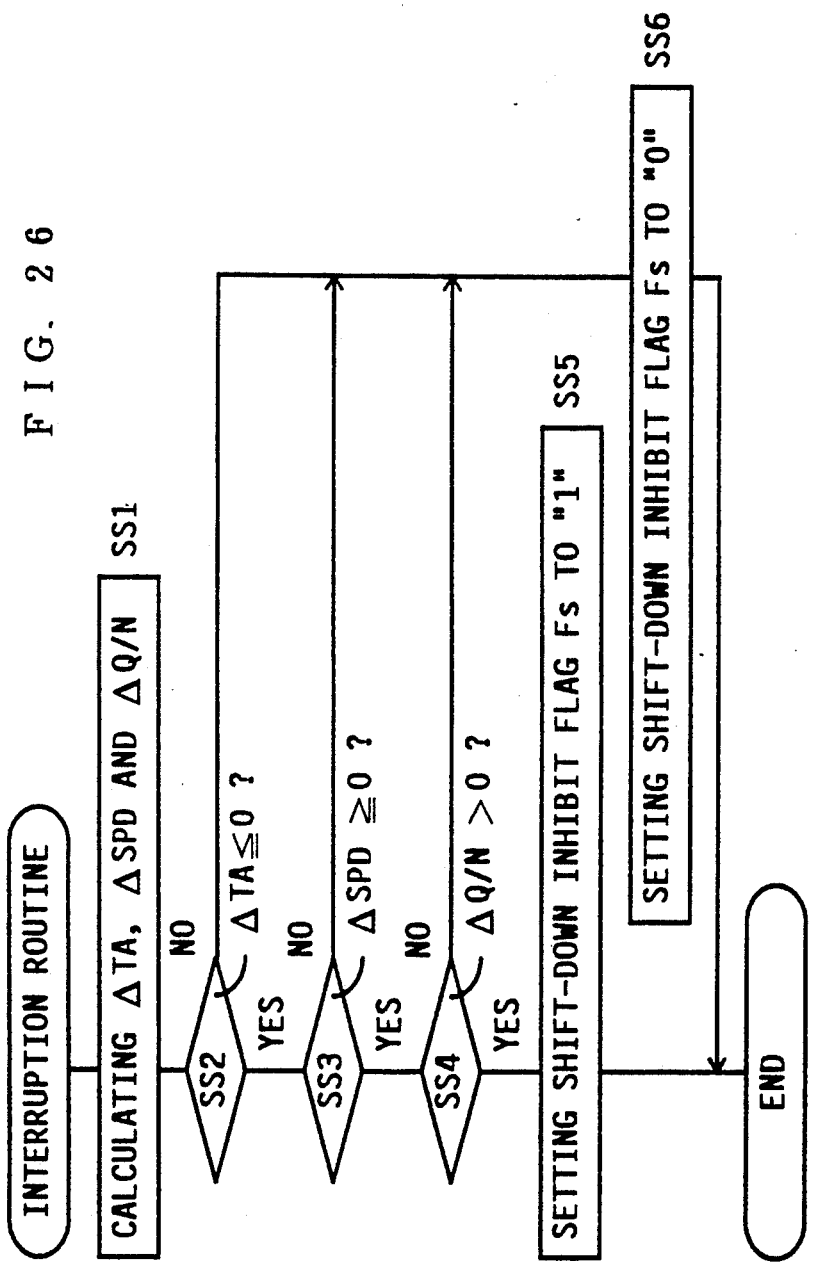
FIG. 26 is a flow chart illustrating an interruption routine executed during interruption of the routine of FIG. 25.
Figure 27:
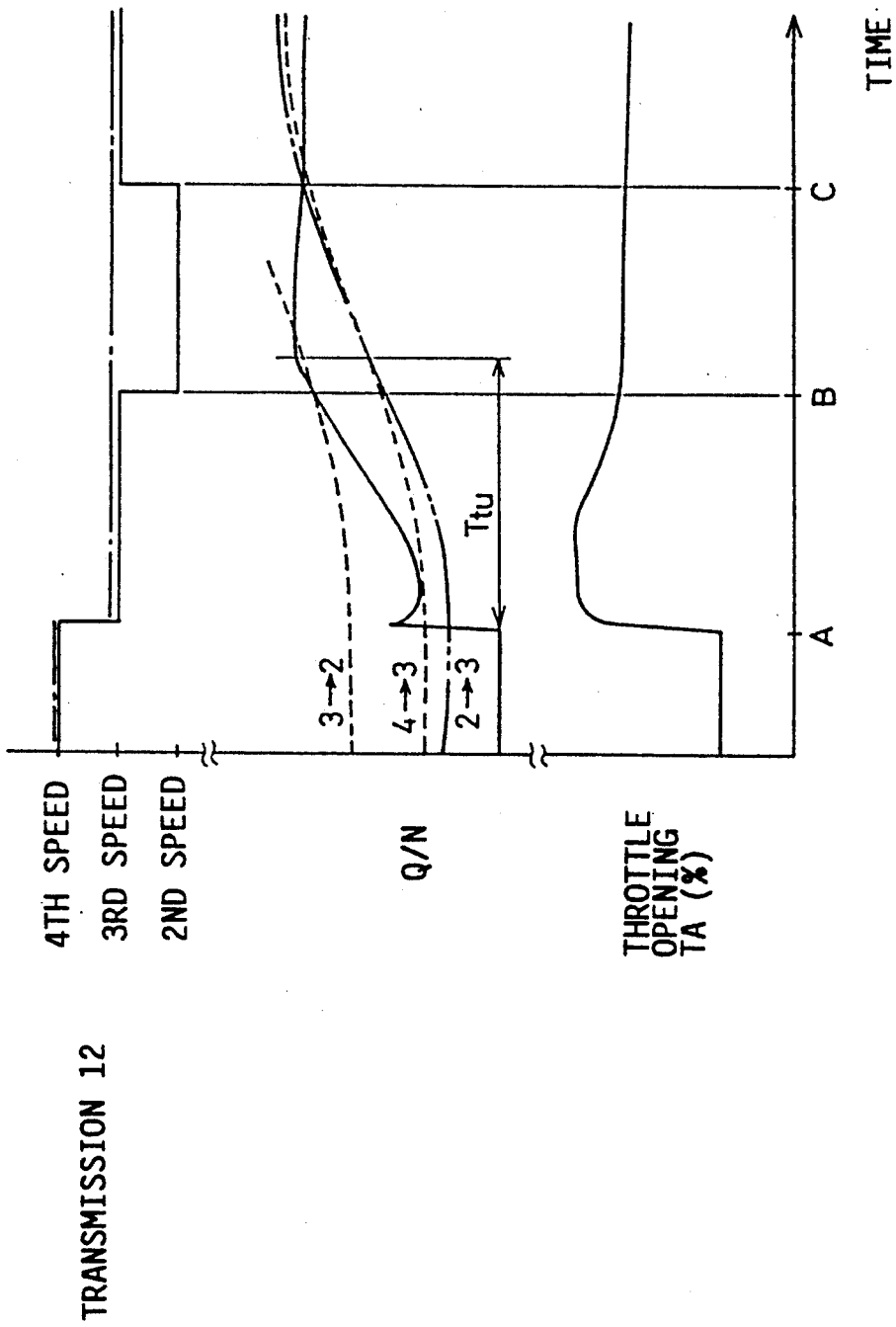
FIG. 27 is a time chart, for explaining a shifting operation of the transmission according to the routines of FIGS. 25 and 26.

Referring next to FIGS. 25-27, there will be described a fifth embodiment of this invention, which uses a shift control routine as illustrated in FIG. 25. As in the preceding embodiment, the ROM 100 stores first and second data maps representative of respective first and second shift boundary lines as shown in FIGS. 19 and 20.

The shift control routine is started with step S601 to read the throttle opening TA, engine speed NE, intake air amount and vehicle speed SPD, and to calculate the intake air quantity Q/N from the intake air amount Q and the engine speed NE. Step S601 is followed by step S602 in which the currently selected position of the automatic transmission 12 is determined based on the output signal from the shift position sensor 92.

Step S602 is followed by step S603 to determine whether or not the current operating condition of the engine 10 is in a TA-control zone in which the second shift boundary lines are used. As in the preceding embodiment, this determination is effected according to a data map stored in the ROM 100, and on the basis of the current throttle opening TA and engine speed NE which were read in step S601. This data map represents a predetermined relationship between the throttle opening TA and the engine speed NE, as indicated in the graph of FIG. 22. This relationship represents a boundary between the above-indicated TA-control zone and a Q/N-control zone in which the first shift boundary lines are used.

If an affirmative decision (YES) is obtained in step S603, the control flow then goes to step S604 to select the TA shift-up boundary line (indicated in one-dot chain line in FIG. 20) corresponding to the currently selected position of the transmission 12, and determine the TA shift-up boundary speed SPDtaup corresponding to the current position of the transmission 12, according to the selected TA shift-up boundary line and the current throttle opening TA. For instance, the TA shift-up boundary speed SPDtaup(2-3) is determined.

Step S604 is followed by step S605 to determine whether or not the transmission 12 should be shifted up, namely, whether or not the current vehicle speed SPD exceeds the determined TA shift-up boundary speed SPDtaup(2-3), for example. If an affirmative decision (YES) is obtained in step S605, step S605 is followed by step S608 in which the transmission controller 96 commands the transmission 12 to be shifted up from the 2nd-speed position to the 3rd-speed position. If a negative decision (NO) is obtained in step S605, step S606 is executed to select the TA shift-down boundary line (indicated in one-dot chain line in FIG. 19) corresponding to the 2nd-speed position of the transmission 12, for example, and determine the TA shift-down boundary speed SPDtadown(2-1) according to the selected TA shift-down boundary line and the current throttle opening TA.

The control flow then goes to step S607 to determine whether or not the transmission 12 should be shifted down, namely, whether or not the current vehicle speed SPD is lower than the TA shift-down boundary speed SPDtadown(2-1). If an affirmative decision (YES) is obtained in step S607, the control flow goes to step S608 in which the transmission controller 96 commands the transmission 12 to be shifted down from the 2nd-speed position to the 1st-speed position. If a negative decision (NO) is obtained in step S607, the transmission 12 remains in the current position, i.e., 2nd-speed position, and the control flow goes back to step S601.

If a negative decision (NO) is obtained in step S603, the control flow then goes to step S609 to select the Q/N shift-up boundary line (indicated in solid line in FIG. 20) corresponding to the currently selected position of the transmission 12, e.g., the 2nd-speed position, and determine the Q/N shift-up boundary speed SPDqnup(2-3), according to the selected Q/N shift-up boundary line and the current intake air quantity Q/N.

Step S609 is followed by step S610 to determine whether or not the transmission 12 should be shifted up, namely, whether or not the current vehicle speed SPD exceeds the determined Q/N shift-up boundary speed SPDtaup(2-3), for example. If an affirmative decision (YES) is obtained in step S610, step S610 is followed by step S608 in which the transmission controller 96 commands the transmission 12 to be shifted up from the 2nd-speed position to the 3rd-speed position. If a negative decision (NO) is obtained in step S610, step S611 is executed to determine whether or not a shift-down inhibit flag Fs is set at "1".

Usually, the flag Fs is set at "0", and step S612 is then executed to select the Q/N shift-down boundary line (indicated in solid line in FIG. 19) corresponding to the 2nd-speed position of the transmission 12, and determine the Q/N shift-down boundary speed SPDqndown(2-1) according to the selected Q/N shift-down boundary line and the current intake air quantity Q/N.

Step S612 is followed by step S613 to determine whether or not the transmission 12 should be shifted down, namely, whether or not the current vehicle speed SPD is lower than the Q/N shift-down boundary speed SPDqndown(2-1). If an affirmative decision (YES) is obtained in step S613, the control flow goes to step S608 in which the transmission controller 96 commands the transmission 12 to be shifted down from the 2nd-speed position to the 1st-speed position. If a negative decision (NO) is obtained in step S613, the transmission 12 remains in the current position, i.e. 2nd-speed position, and the control flow goes back to step S601.

If an affirmative decision (YES) is obtained in step S611, that is, if the shift-down inhibit flag Fs is set at "1", the present cycle of execution of the shift control routine of FIG. 25 is completed, skipping the following steps S612, S613 and S608. This shift-down inhibit flag Fs is set to "1" in an interruption routine of FIG. 26, if the following three conditions are satisfied: (1) The throttle opening TA is not increasing; (2) The vehicle speed SPD is not being reduced; and (3) The torque of the engine 10 is increasing. If any one of these three conditions is not satisfied, the flag Fs is set to "0". The interruption routine is implemented at a predetermined time interval of several to tens of msecs. More specifically, the interruption routine of FIG. 26 is started with step SS1 to calculate amounts of change $\Delta TA$, $\Delta SPD$ and $\Delta Q/N$ of the throttle opening TA, vehicle speed SPD and intake air quantity $Q/N$. Each of these amounts of change $\Delta TA$, $\Delta SPD$ and $\Delta Q/N$ is a difference between the values read in the preceding and present cycles of execution of the interruption routine.

Step SS1 is followed by step SS2 to determine whether or not the amount of change $\Delta TA$ is equal to or smaller than zero, namely, whether or not the vehicle driver is requiring deceleration or constant-speed running of the vehicle. If an affirmative decision (YES) is obtained in step SS2, step SS3 is executed to determine whether or not the amount of change $\Delta SPD$ is equal to or larger than zero, namely, whether or not the vehicle speed is constant or increasing. If an affirmative decision (YES) is obtained in step SS3, step SS4 is executed to determine whether or not the amount of change $\Delta Q/N$ is larger than zero, namely, whether or not the engine torque is increasing.

If the affirmative decision (YES) is obtained in all of the three steps SS2-SS4, the control flow goes to step SS5 in which the down-shift inhibit flag Fs is set to "1". If a negative decision (NO) is obtained in any of these three steps SS2-SS4, step SS6 is executed to reset the flag Fs to "0".

The amount of change $\Delta TA \leq 0$ in step SS2 means that the vehicle driver is not requiring acceleration of the vehicle. Therefore, the affirmative decision (YES) in all of the three steps SS2, SS3 and SS4 means that the intake air quantity Q/N is increasing even though the vehicle driver is not requiring the vehicle acceleration and the vehicle is not in the process of deceleration. An increase in the intake air quantity Q/N means an increase in the engine torque. In this case, the shift-down inhibit flag Fs is set to "1" in step SS5 of the interruption routine of FIG. 26, for the purpose of inhibiting a shift-down action of the transmission 12 in step S611 in the shift control routine of FIG. 25, to avoid an unexpected shift-down operation of the transmission 12 due to an increase in the intake air quantity Q/N, which may arise, without an increase in the operation amount of the accelerator pedal 58 or opening TA of the throttle valve 34, in connection with operations of the turbocharger 32, valve timing changing device, a swirl control valve device, etc.

Referring to the timing chart of FIG. 27, there is shown a shifting condition of the transmission 12 when the throttle opening TA is increased upon depression of the accelerator pedal 58. When the throttle opening TA rises at point A by depression of the accelerator pedal 58, the intake air quantity Q/N suddenly rises substantially at the same time as the throttle opening TA, as indicated in solid line. The intake air quantity Q/N slightly decreases after the sudden rise, but it continuously increases thereafter as a result of operation of the turbocharger 32, until a time Ttu so-called "turbo-charger lag" associated with the turbocharging operation elapses. Then, the intake air quantity Q/N is held substantially constant. The Q/N shift-down boundary lines (3→2) and (4→3) indicated by solid lines in FIG. 19 correspond to the changes in the intake air quantity Q/N as indicated by dashed lines in FIG. 27, while the Q/N shift-up boundary line (2→3) indicated in solid line in FIG. 20 corresponds to a change in the intake air quantity Q/N indicated by two-dot chain line in FIG. 27. Hence, intersection of the solid line indicating the actual change in the intake air quantity Q/N with the dashed and two-dot chain lines corresponding to the Q/N shift boundary lines means actual shift-down or shift-up actions of the transmission 12. Since the actual intake air quantity Q/N rises above the shift-down boundary line (4→3) indicated by the lower dashed line, upon sudden rising at point A, the transmission 12 is commanded to be shifted from the 4th-speed position down to the 3rd-speed position. As the intake air quantity Q/N continuously increases due to the effect of the turbocharger 32, it rises above the Q/N shift-down line (3→2) indicated by the upper dashed line, whereby the transmission 12 would be commanded to be shifted from the 3rd-speed position down to the 2nd-speed position, at point B, if step S611 of FIG. 25 were not provided. As the vehicle speed SPD increases thereafter, the Q/N shift-down boundary line (3→2) increases, the actual intake air quantity Q/N becomes smaller than the level of the Q/N shift-down boundary line (3→2), whereby the transmission 12 is commanded to be shifted up to the 3rd-speed position, at point C. In the present embodiment in which step S611 is provided, the transmission 12 is inhibited from being shifted down from the 3rd-speed position to the 2nd-speed position, even though the actual intake air quantity Q/N increases due to the effect of the turbocharger 32. Namely, the shift-down action of the transmission 12 is inhibited even with an increase in the intake air quantity Q/N (engine torque), because the throttle opening TA is not increasing and the vehicle is not being decelerated. Accordingly, the transmission 12 remains in the 3rd-speed position as indicated in one-dot chain line in FIG. 27.

While the inhibition of the shift-down action of the transmission 12 upon increase in the intake air quantity Q/N due to the effect of the turbocharger 32 has been described by reference to FIG. 27, the shift-down inhibiting step S611 and the associated interruption routine of FIG. 26 is equally applicable to a motor vehicle equipped with a valve timing changing device or a swirl control valve device.

The present fifth embodiment may be modified such that only the Q/N shift boundary lines indicated in solid lines in FIGS. 19 and 20 are used for controlling the transmission 12. Further, some or all of the TA shift-up boundary lines indicated in one-dot chain lines in FIG. 20 may be eliminated.

Figure 28:
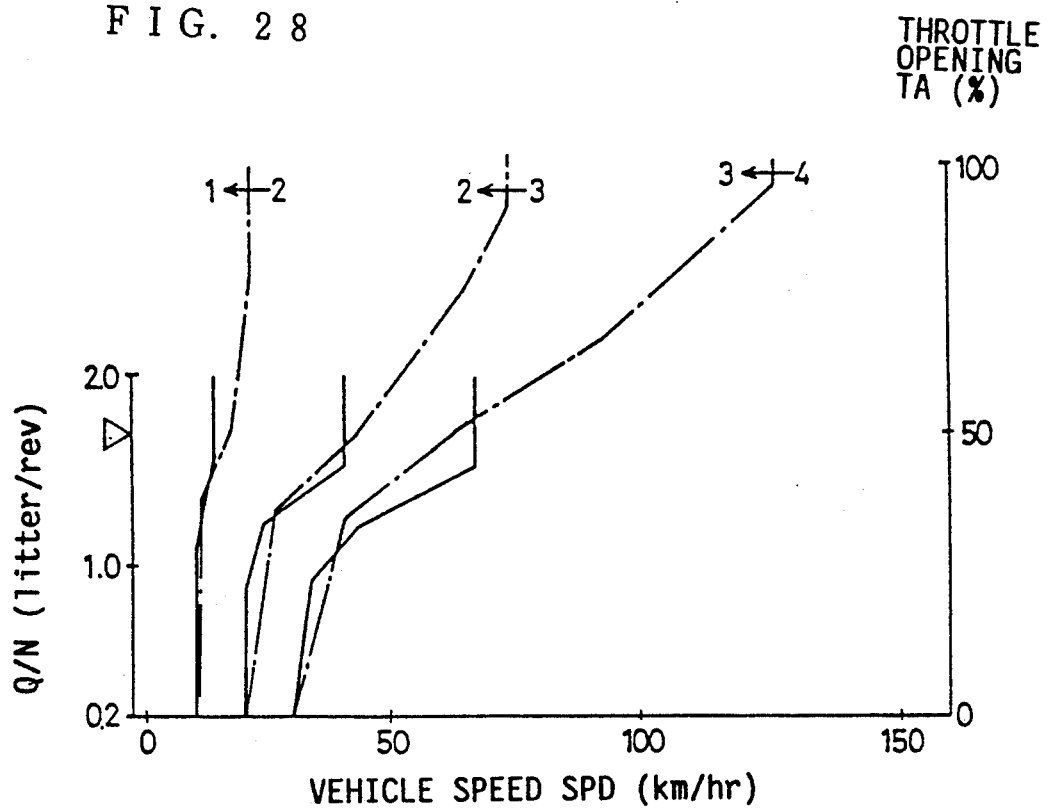
FIGS. 28 and 29 are graphs showing shift-down and shift-up boundary lines alternative to those of FIGS. 19 and 20, used in a sixth embodiment of this invention.
Figure 29:
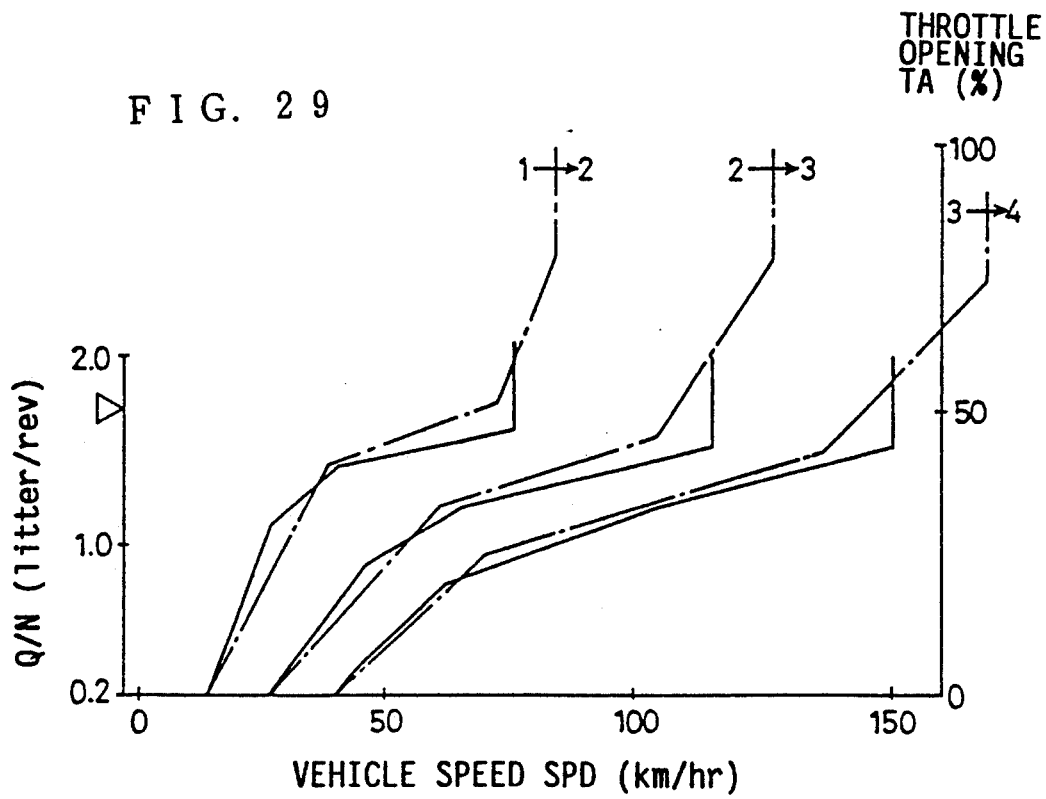
Figure 30:
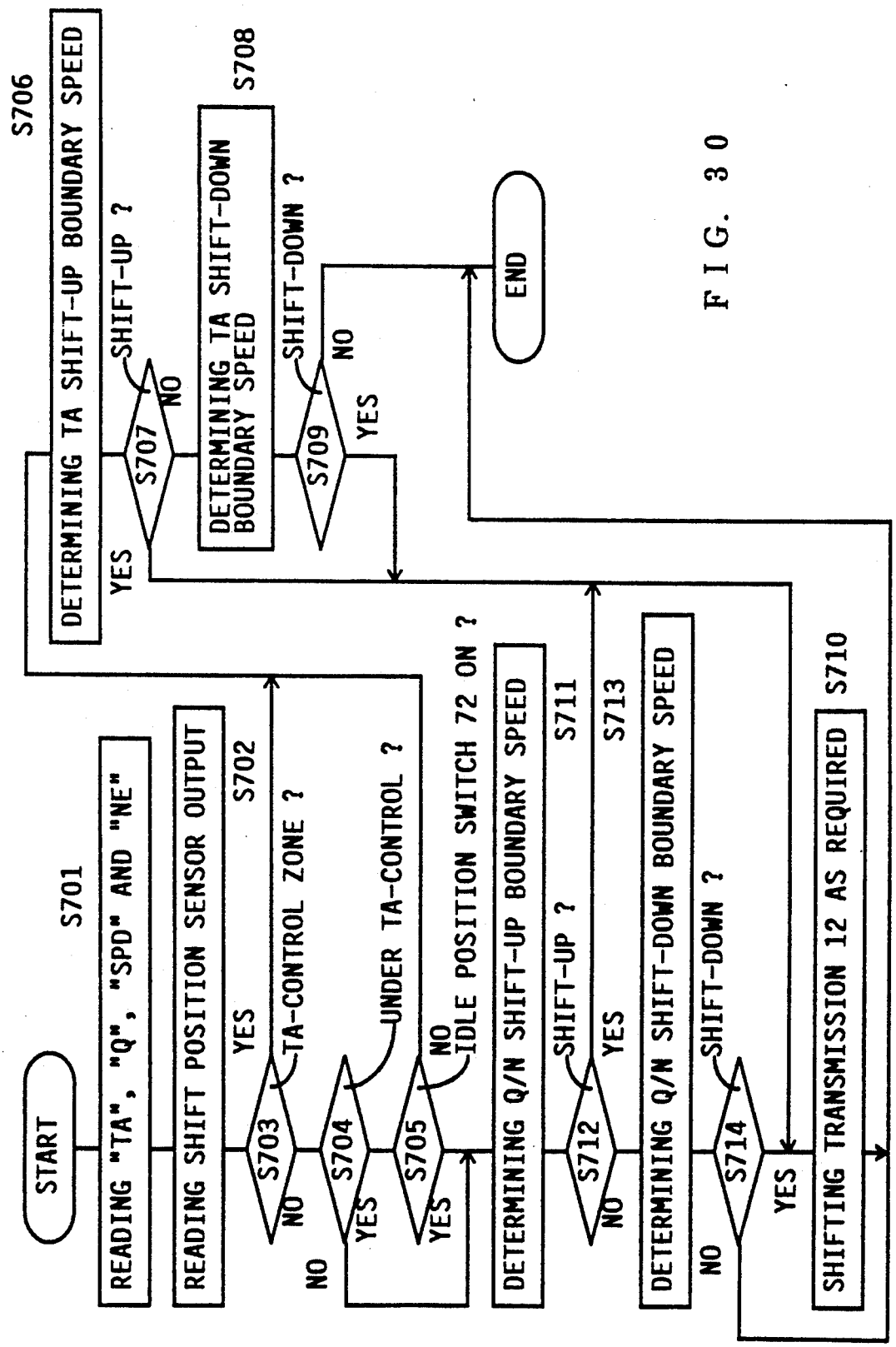
FIG. 30 is a flow chart illustrating a shift control routine implemented in the sixth embodiment.

Referring next to FIGS. 28-33, there will be described a sixth embodiment of this invention, which uses a shift control routine as illustrated in FIG. 30. As in the preceding embodiments, the ROM 100 stores first and second data maps representative of respective first and second shift boundary lines as shown in FIGS. 28 and 29.

The shift control routine is started with step S701 to read the throttle opening TA, intake air amount Q, vehicle speed SPD, and engine speed NE, and to calculate the intake air quantity Q/N from the intake air amount Q and the engine speed NE. Step S701 is followed by step S702 in which the currently selected position of the automatic transmission 12 is determined based on the output signal from the shift position sensor 92.

Figure 31:
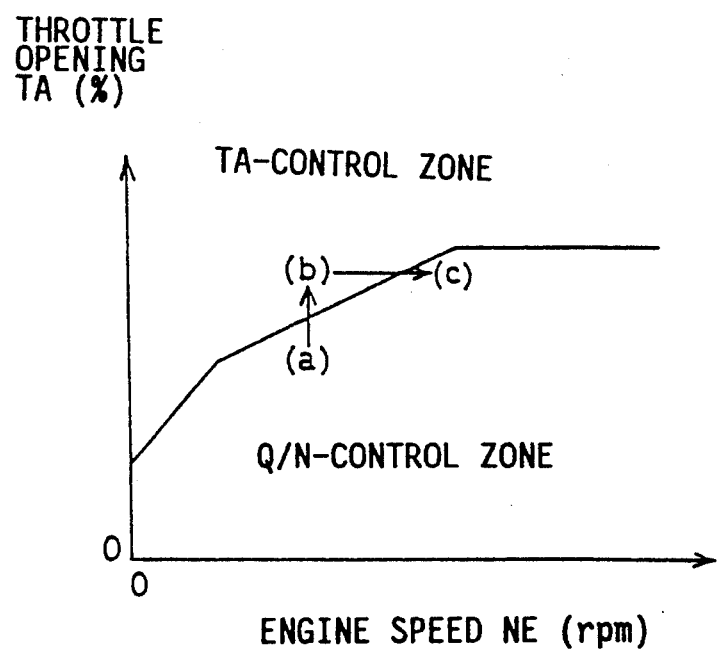
FIG. 31 is a graph indicating TA-control and Q/N-control zones for shifting the transmission in relation to the throttle opening and the engine speed, according to the shift control routine of FIG. 30.

Step S702 is followed by step S703 to determine whether or not the current operating condition of the engine 10 is in the TA-control zone in which the second or TA shift boundary lines are used. As in the preceding embodiments, this determination is effected according to a data map stored in the ROM 100, and on the basis of the current throttle opening TA and engine speed NE which were read in step S701. This data map represents a predetermined relationship between the throttle opening TA and the engine speed NE, as indicated in the graph of FIG. 31, which relationship represents a boundary between the above-indicated TA-control zone and the Q/N-control zone in which the first or Q/N shift boundary lines are used. Step S703 is similar to steps S504 and S603 in the preceding embodiments.

If an affirmative decision (YES) is obtained in step S703, steps S706–S710 are executed to control the transmission 12 according to the TA shift boundary lines indicated in one-dot chain lines in FIGS. 28 and 29. If a negative decision (NO) is obtained in step S703, the control flow goes to step S704 to determine whether or not the transmission 12 is currently controlled according to the TA shift boundary lines, and step S705 to determine whether or not the idle position switch 72 is ON, i.e., whether or not the ENGINE IDLE signal indicative of the fully closed position of the throttle valve 34 is received from the switch 72. If an affirmative decision (YES) is obtained in both of these steps S704 and S705, that is, if the TA shift boundary lines are currently used and the throttle valve 34 is fully closed with the idle position switch 72 in the ON position, steps S711–S714 and S710 are executed to control the transmission 12 according to the Q/N shift boundary lines indicated in solid lines in FIGS. 28 and 29. Steps S704 and S705 function to permit the replacement of the TA shift boundary lines by the Q/N boundary lines, only when the shift boundary speed of the TA shift boundary line and the shift boundary speed of the Q/N shift boundary line are sufficiently close to each other.

If a negative decision (NO) is obtained in step S704, this means that the Q/N shift boundary lines are currently used with the affirmative decision (YES) in step S703 that the Q/N shift boundary lines should be used. In this case, therefore, step S711 and the following steps are executed to control the transmission 12 according to the Q/N shift boundary lines. If the idle position switch 72 is not ON, step S705 is followed by steps S706–S710 are executed to control the transmission 12 according to the TA shift boundary lines, even if the decision to use the Q/N shift boundary lines is obtained in step S703.

In step S706 following the affirmative decision (YES) in step S703, the CPU 98 selects the TA shift-up boundary line (indicated in one-dot chain line in FIG. 29) corresponding to the currently selected position of the transmission 12, and determines the TA shift-up boundary speed SPDtaup corresponding to the current position of the transmission 12, according to the selected TA shift-up boundary line and the current throttle opening TA. For instance, the TA shift-up boundary speed SPDtaup(2-3) is determined.

Step S706 is followed by step S707 to determine whether or not the transmission 12 should be shifted up, namely, whether or not the current vehicle speed SPD exceeds the determined TA shift-up boundary speed SPDtaup(2-3), for example. If an affirmative decision (YES) is obtained in step S707, step S707 is followed by step S710 in which the transmission controller 96 commands the transmission 12 to be shifted up from the 2nd-speed position to the 3rd-speed position. If a negative decision (NO) is obtained in step S707, step S708 is executed to select the TA shift-down boundary line (indicated in one-dot chain line in FIG. 28) corresponding to the 2nd-speed position of the transmission 12, for example, and determine the TA shift-down boundary speed SPDtadown(2-1) according to the selected TA shift-down boundary line and the current throttle opening TA.

The control flow then goes to step S709 to determine whether or not the transmission 12 should be shifted down, namely, whether or not the current vehicle speed SPD is lower than the TA shift-down boundary speed SPDtadown(2-1). If an affirmative decision (YES) is obtained in step S709, the control flow goes to step S610 in which the transmission controller 96 commands the transmission 12 to be shifted down from the 2nd-speed position to the 1st-speed position. If a negative decision (NO) is obtained in step S709, the transmission 12 remains in the current position, i.e., 2nd-speed position, and the control flow goes back to step S701.

In step S711 following the affirmative decision (YES) in step S705, the CPU 98 selects the Q/N shift-up boundary line (indicated in solid line in FIG. 29) corresponding to the currently selected position of the transmission 12, e.g., the 2nd-speed position, and determine the Q/N shift-up boundary speed SPDqnup(2-3), according to the selected Q/N shift-up boundary line and the current intake air quantity Q/N.

Step S711 is followed by step S712 to determine whether or not the transmission 12 should be shifted up, namely, whether or not the current vehicle speed SPD exceeds the determined Q/N shift-up boundary speed SPDqnup(2-3), for example. If an affirmative decision (YES) is obtained in step S712, step S710 is executed to command the transmission 12 to be shifted up from the 2nd-speed position to the 3rd-speed position. If a negative decision (NO) is obtained in step S712, step S713 is executed to select the Q/N shift-down boundary line (indicated in solid line in FIG. 28) corresponding to the 2nd-speed position, and determine the Q/N shift-down boundary speed SPDqndown(2-1), according to the selected Q/N shift-down boundary line and the current intake air quantity Q/N.

Step S713 is followed by step S714 to determine whether or not the transmission 12 should be shifted down, namely, whether or not the current vehicle speed SPD is lower than the Q/N shift-down boundary speed SPDqndown(2-1). If an affirmative decision (YES) is obtained in step S714, the control flow goes to step S710 in which the transmission controller 96 commands the transmission 12 to be shifted down from the 2nd-speed position to the 1st-speed position. If a negative decision (NO) is obtained in step S714, the transmission 12 remains in the current position, i.e., 2nd-speed position, and the control flow goes back to step S701.

It will be understood from the above description of this sixth embodiment that once the TA shift boundary lines are selected in step S703, the replacement of these TA shift boundary lines by the Q/N shift boundary lines is inhibited until the idle position switch 72 is turned ON, i.e., until the throttle valve 34 is fully closed. Therefore, the Q/N shift boundary lines are not used immediately after the affirmative decision (YES) in step S703, but are used only after the throttle opening TA is almost zeroed. This arrangement prevents frequent shifting of the transmission 12 upon switching of the TA shift boundary lines to the Q/N shift boundary lines.

As indicated in FIGS. 28 and 29, the shift boundary speeds of the TA shift boundary lines and the Q/N shift boundary lines are close to each other, when the throttle opening TA is zero or relatively close to zero. Accordingly, the present embodiment is desirable in preventing successive shifting actions of the transmission 12, which would occur upon switching between the TA shift boundary lines and the Q/N shift boundary lines.

Figure 32:
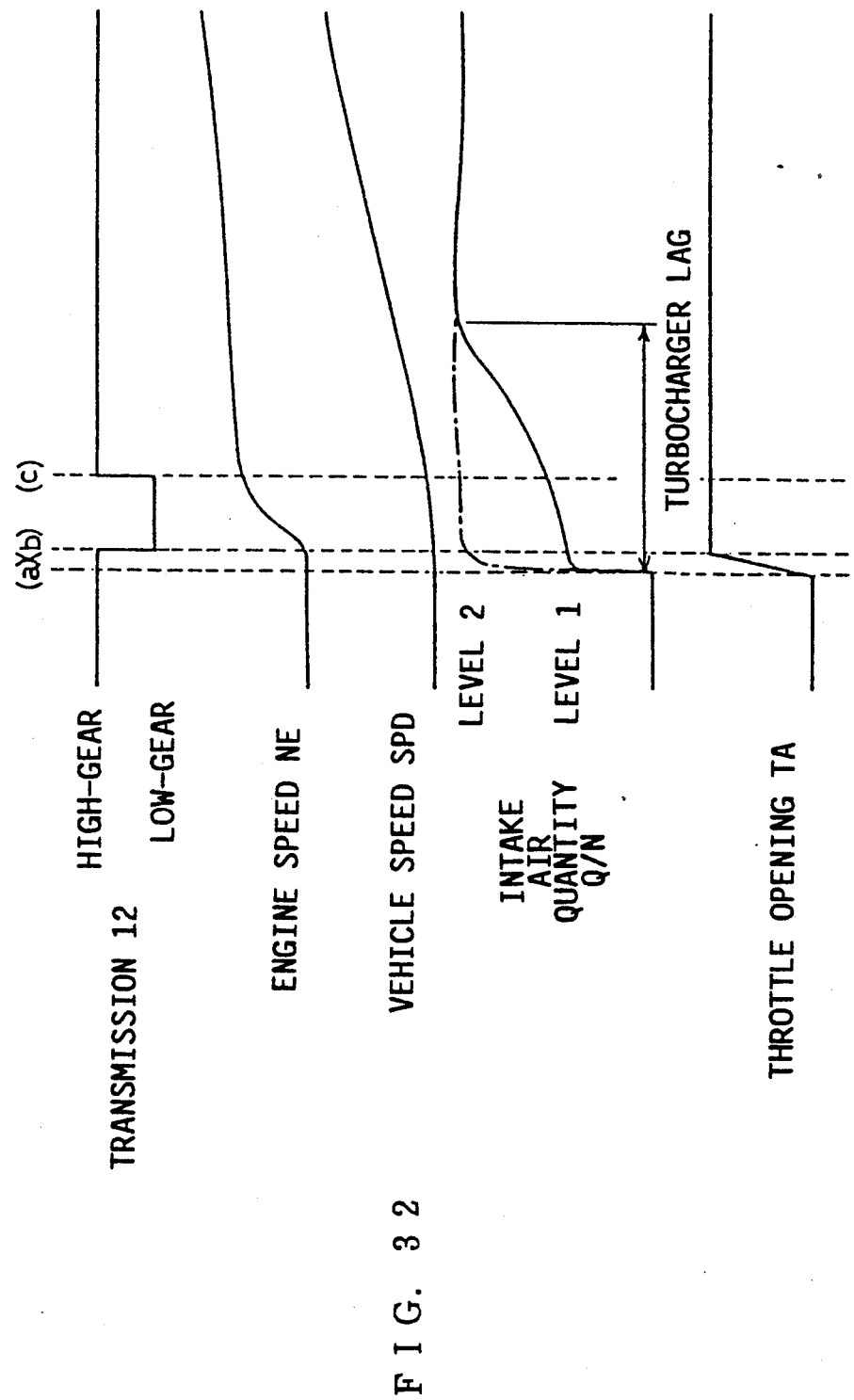
FIG. 32 is a time chart showing shift actions of the transmission according to a shift control apparatus in which steps S704 and S705 are not provided.
Figure 33:
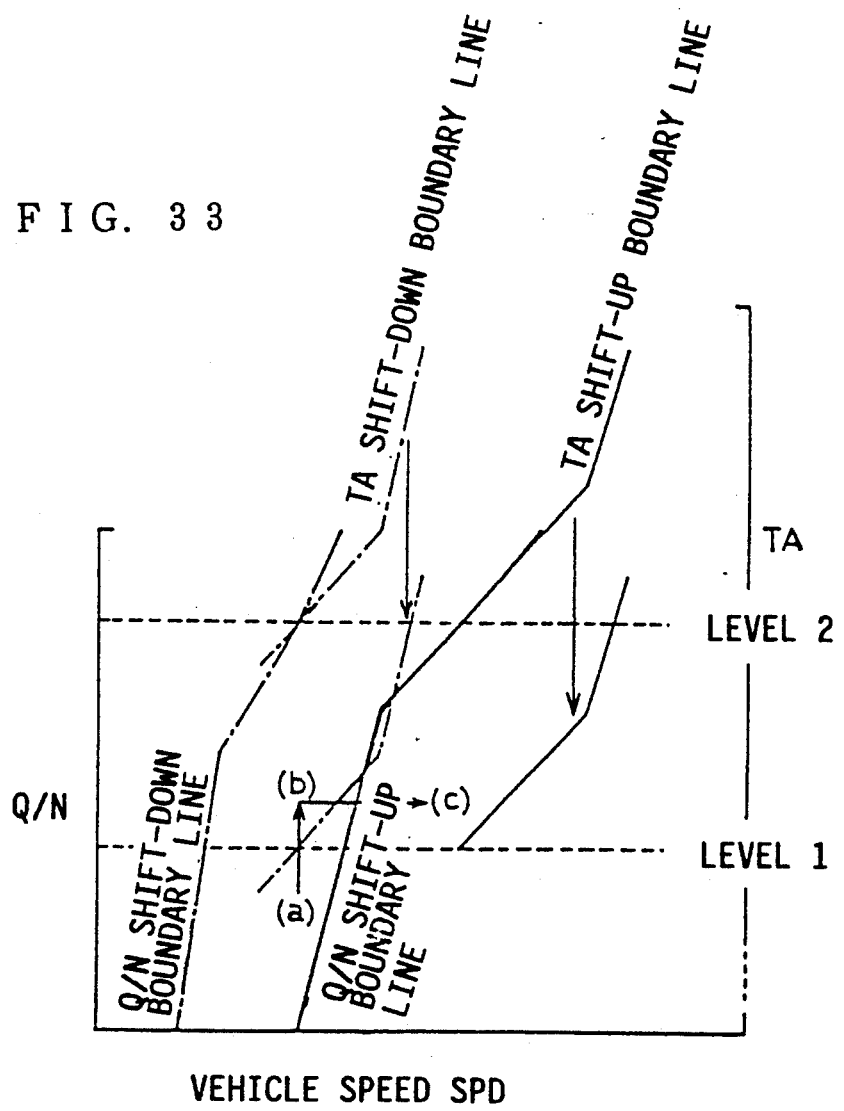
FIG. 33 is a graph showing shift-down and shift-up boundary lines used in the shift control apparatus.

Referring to the timing chart of FIG. 32, points of time indicated at (a), (b) and (c) correspond to (a), (b) and (c) in FIGS. 31 and 33. The timing chart of FIG. 32 shows successive shift-down and shift-up actions at points (b) and (c), where step S705 in FIG. 30 were not provided. When the throttle opening TA is suddenly increased from (a) to (b) as indicated in FIG. 31, the Q/N shift boundary lines which have been used are replaced by the TA shift boundary lines. Immediately after this replacement, the intake air quantity Q/N is small and the throttle opening TA is accordingly low as indicated at LEVEL 1 in FIG. 33, whereby the control of the transmission according to the TA shift boundary line is started with a comparatively small amount of the throttle opening TA. At this time, the TA shift boundary line used for controlling the transmission 12 is shifted a considerable amount in the lower direction along the axis of the intake air quantity Q/N, from the normal TA shift boundary line which is used when the throttle opening TA exceeds about 50% level as indicated at LEVEL 2 in FIG. 33. Accordingly, the TA shift-down boundary line approaches the Q/N shift-up boundary line, whereby the transmission 12 is shifted down as indicated at point (b) in FIG. 32. Thereafter, the intake air quantity Q/N and the vehicle speed SPD increase due to the effect of the turbocharger 32, without an increase in the throttle opening TA. As a result, the TA shift boundary lines are replaced by the Q/N shift boundary lines, as indicated at (c) in FIG. 31, and the vehicle speed SPD crosses the appropriate Q/N shift-up boundary line as indicated in FIG. 33, whereby the transmission 12 is shifted up as indicated at (c) in FIG. 32. Thus, the transmission is shifted down and then shifted up in a relatively short period of time, deteriorating the driving comfort of the vehicle, when the TA shift boundary lines are replaced by the Q/N shift boundary lines, if step S705 were not provided in the shift control routine of FIG. 30.

Figure 34:
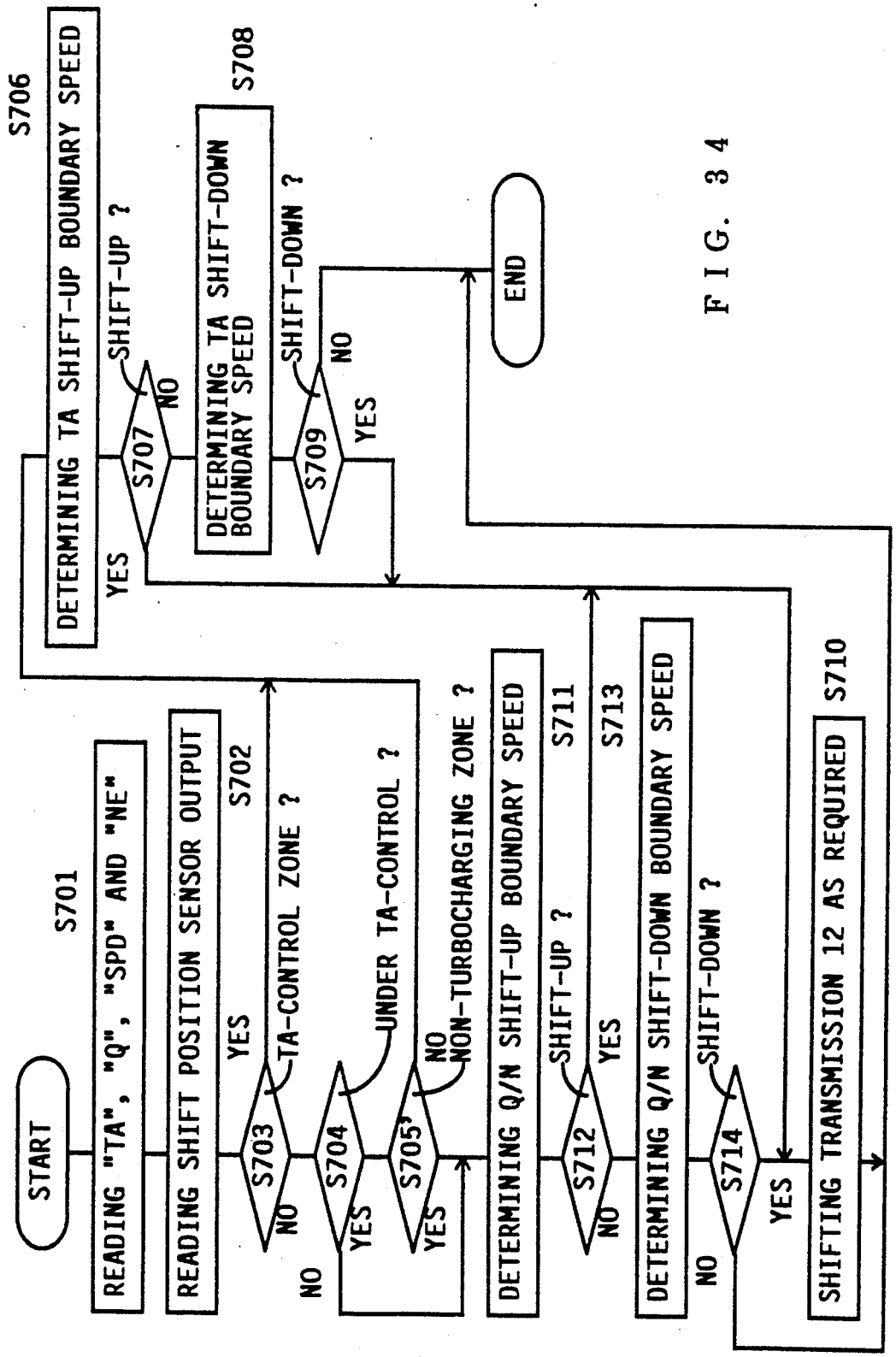
FIG. 34 is a flow chart illustrating a shift control routine alternative to the routine of FIG. 30, used in a seventh embodiment of the invention.
Figure 35:
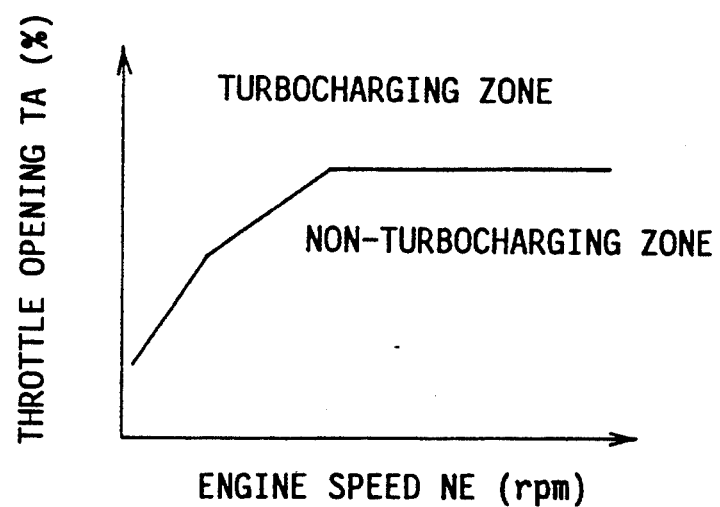
FIG. 35 is a graph indicating turbocharging and non-turbocharging zones for shifting the transmission in relation to the throttle opening and the engine speed, in the embodiment of FIG. 34.

A seventh embodiment of this invention will be described by reference to FIGS. 34 and 35, which is a modification of the sixth embodiment.

The shift control routine implemented in this embodiment is different from that of the preceding embodiment of FIG. 30, in that step S705' is substituted for step S705. More specifically, step S705' is provided to determine whether or not the operating condition of the engine 10 is currently in a non-turbocharging zone. This determination is effected on the basis of the throttle opening TA and engine speed Ne (which are read in step S701), and according to a data map which is stored in the ROM 100 and which represents a relationship between the throttle opening TA and the engine speed NE. In the present embodiment, the replacement of the TA shift boundary lines by the Q/N shift boundary lines is permitted when the turbocharger 32 is not performing a turbocharging function. In the non-turbocharging zone indicated in FIG. 35, the intake air quantity Q/N rapidly increases as indicated in one-dot chain line in FIG. 32, upon increasing of the throttle opening TA. Accordingly, the control of the transmission 12 according to the TA shift boundary lines is started when the intake air quantity Q/N is sufficiently large as indicated at LEVEL 2 in FIG. 33.

The sixth and seventh embodiments described above is adapted for use with a vehicle whose engine is equipped with the turbocharger 32, the principle of these embodiments is equally applicable to a vehicle engine equipped with a valve timing changing device, a swirl control valve device, or other devices, which may cause a change in the intake air quantity Q/N and vehicle speed SPD, without a change in the throttle opening TA, leading to successive shifting actions of the transmission 12. Further, the shift control routines of FIGS. 30 and 34 may be modified such that the replacement of the Q/N shift boundary lines by the TA shift boundary lines is inhibited until a suitable condition of the vehicle is satisfied.

While the idle position switch 72 is used to detect the fully closed position of the throttle valve 34 in step S705, the output of the throttle sensor 74 may be used to effect the decision in step S705.

In the seventh embodiment, the data map stored in the ROM 100 which represents the relationship between the engine speed NE and the throttle opening TA is used in step S705' to determine the non-turbocharging state of the turbocharger 32. However, this determination may be effected on the basis of the output of a pressure sensor which is adapted to sense the pressure in a portion of the intake pipe of the engine 10, which is downstream of the turbocharger 32. In this case, the affirmative decision (YES) is obtained when the pressure sensed by the pressure sensor is equal to or lower than the atmospheric pressure.

Figure 36:
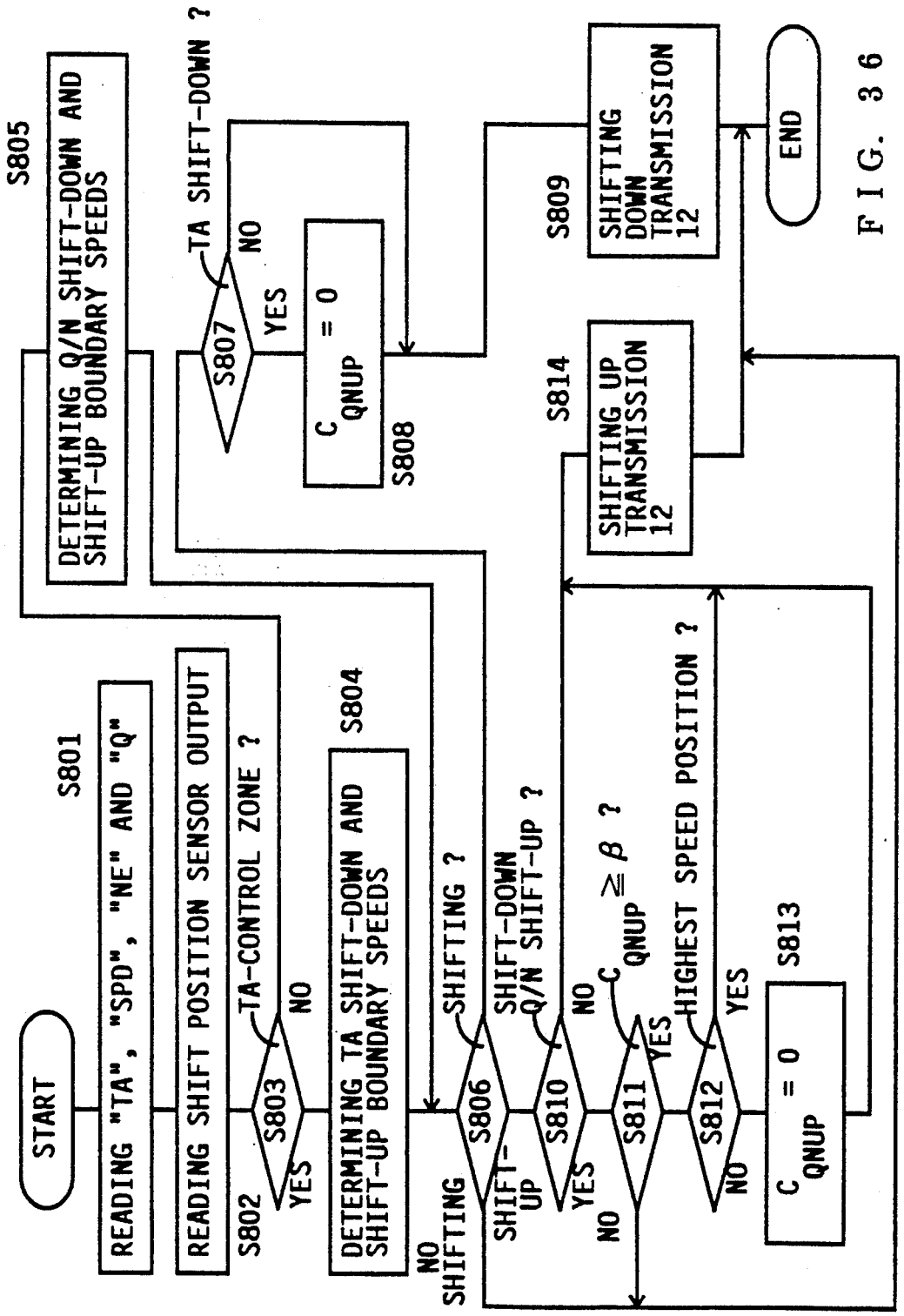
FIG. 36 is a flow chart illustrating a shift control routine used in an eight embodiment of the invention.
Figure 37:
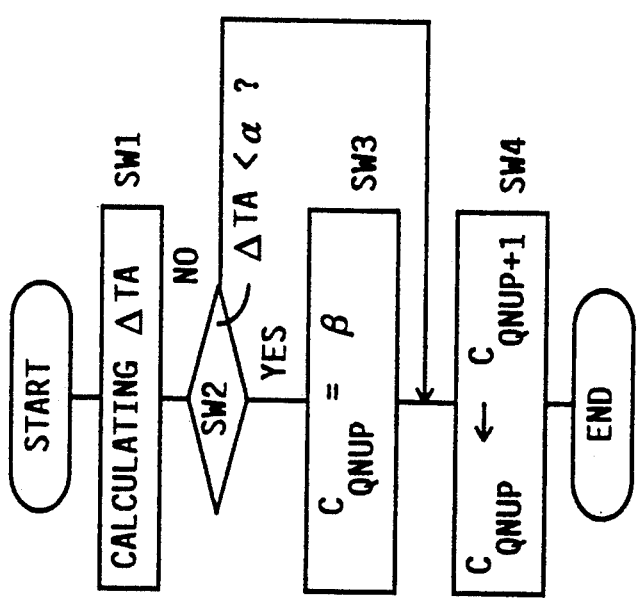
FIG. 37 is a flow chart illustrating an interruption routine executed during interruption of the routine of FIG. 36.

Referring next to FIGS. 36 and 37, there will be described an eighth embodiment of this invention, which is capable of solving the same problem as solved by the sixth and seventh embodiments. As in the fourth embodiment of FIGS. 19-24, the ROM 100 used in this eighth embodiment stores first and second data maps representative of respective first and second shift boundary lines as shown in FIGS. 19 and 20.

The ROM 100 also stores a shift control routine as illustrated in FIG. 36. This shift control routine is started with step S801 to read the throttle opening TA, vehicle speed SPD, engine speed NE and intake air amount Q, and to calculate the intake air quantity Q/N from the intake air amount Q and the engine speed NE. Step S801 is followed by step S802 in which the currently selected position of the automatic transmission 12 is determined based on the output signal from the shift position sensor 92.

Step S802 is followed by step S803 to determine whether or not the current operating condition of the engine 10 is in the TA-control zone, as described above with respect to steps S504, S603 and S703 in the preceding embodiments.

If an affirmative decision (YES) is obtained in step S803, step S804 is executed to select the TA shift-down and shift-up boundary lines (indicated in one-dot chain lines in FIGS. 19 and 20) corresponding to the currently selected position of the transmission 12, and determine the TA shift-down and shift-up boundary speeds SPDtadown and SPDtaup corresponding to the current position of the transmission 12, according to the selected TA shift-down and shift-up boundary lines and the current throttle opening TA. For instance, the TA shift-down and shift-up boundary speeds SPDtadown(2-1) and SPDtaup(2-3) are determined.

If a negative decision (NO) is obtained in step S803, step S805 is executed to select the Q/N shift-down and shift-up boundary lines (indicated in solid lines in FIGS. 19 and 20) corresponding to the currently selected position of the transmission 12, and determine the Q/N shift-down and shift-up boundary speeds SPDqndown and SPDqnup corresponding to the current position of the transmission 12, according to the selected Q/N shift-down and shift-up boundary lines and the current intake air quantity Q/N. For instance, the Q/N shift-down and shift-up boundary speeds SPDqndown(2-1) and SPDqnup(2-3) are determined.

Steps S804 and S805 are followed by step S806 to determine whether the transmission 12 should be shifted down or shifted up, or should not be shifted. Namely, the current vehicle speed SPD is compared with the determined TA and Q/N shift-down and shift-up boundary speeds determined in steps S804 and S805. If the current vehicle speed SPD is higher than the TA or Q/N shift-up boundary speed SPDtaup(2-3) or SPDqnup(2-3), the transmission 12 should be shifted up. If the vehicle speed SPD is lower than the TA or Q/N shift-down boundary speed SPDtadown(2-1) or SPDqndown(2-1), the transmission 12 should be shifted down. In the other cases, the transmission should not be shifted.

If step S806 decides that the transmission 12 should not be shifted, one cycle of execution of the shift control routine is completed, and the control flow goes back to step S801.

If step S806 decides that the transmission 12 should be shifted down, step S806 is followed by step S807 to determine whether or not the TA shift-down boundary line was selected in step S804. If a negative decision (NO) is obtained in step S807, this means that the Q/N shift-down boundary line was selected in step S805, the control flow goes to step S809, skipping step S808. In step S809, the CPU 98 commands the transmission 12 to be shifted down, from the 2nd-speed position down to the 1st-speed position, for example. If an affirmative decision (YES) is obtained in step S807, this means that the TA shift-down boundary line was selected in step S806, step S808 is executed to reset a time counter Cqnup to "0", and step S809 is executed to shift down the transmission 12.

The time counter Cqnup is changed by execution of an interruption routine of FIG. 37, which is executed at a predetermined time interval of several to tens of msecs. The interruption routine is started with step SW1 in which an amount of change ΔTA in the throttle opening TA is calculated. ΔTA is a difference (TAn-- TAn−1) between the throttle opening TAn obtained in the present cycle of this interruption routine and the throttle opening TAn−1 obtained in the last cycle. Step SW1 is followed by step SW2 to determine whether or not the amount of change ΔTA is smaller than a predetermined threshold Δ. This threshold Δ is a negative value which is experimentally determined. This negative value is a lower limit of the rate of decrease in the throttle opening TA, above which it is reasonable to determine that there exists a vehicle driver's intention to decelerate the vehicle after acceleration of the vehicle. In other words, the absolute value |ΔTA| represents a rate at which the accelerator pedal 58 is returned from the operated position toward the non-operated position. Namely, step SW2 is executed to determine whether or not the return speed |ΔTA| of the accelerator pedal 58 exceeds the predetermined threshold |α|, that is, whether the pedal 58 is returned or released at a rate high enough to indicate the driver's desire to decelerate the vehicle.

If an affirmative decision (YES) is obtained in step SW2, step SW3 is executed to set the time counter Cqnup to a predetermined suitable value β. Step SW3 is followed by step SW4 in which the time counter Cqnup is incremented by "1", i.e., set to (β+1). If a negative decision (NO) is obtained in step SW2, step SW2 is followed by step SW4, without execution of step SW3. The predetermined value β corresponds to a waiting time, e.g., a few or several seconds, that should elapse to permit the transmission 12 to be shifted up according to the Q/N shift-up boundary line (in step S814), after the transmission is shifted down according to the TA shift-down boundary line (in step S809).

Referring back to the shift control routine of FIG. 36, step S806 is followed by step S810 if step S806 decides that the transmission 12 should be shifted up. Step S810 determines whether or not the Q/N shift-up boundary line was selected in step S805. If a negative decision (NO) is obtained in step S810, this means that the TA shift-up boundary line was selected in step S804, the control flow goes to step S814 in which the CPU 98 of the transmission controller 96 commands the transmission 12 to be shifted up. If an affirmative decision (YES) is obtained in step S810, this means that the Q/N shift-up boundary line was selected in step S805, step S811 is executed to determine whether or not the time counter Cqnup is equal to or larger than the predetermined value β.

An affirmative decision (YES) is obtained in step S811 if the waiting time represented by the predetermined value β has elapsed, or if the accelerator pedal 58 is returned at a rate |ΔTA| higher than the threshold value |α|. In the latter case, the time counter Cqnup is equal to (β+1). In the other cases, a negative decision (NO) is obtained in step S811, and the present cycle of execution of the shift control routine is completed.

If an affirmative decision (YES) is obtained in step S811, step S812 is executed to determine whether or not the position to which the transmission 12 is shifted up according to the selected Q/N shift-up boundary line is the highest-speed position. If an affirmative decision (YES) is obtained in step S812, step S814 is executed to command the transmission 12 to be shifted up to the highest-speed position. If a negative decision (NO) is obtained in step S812, step S813 is executed before step S814, to reset the time counter Cqnup to "0", so that the negative decision (NO) is obtained in step S811 to prevent a possibility of a further shift-up action of transmission 12.

In the present eighth embodiment, the transmission 12 is inhibited from being shifted up according to the Q/N shift-down boundary line after a shift-down action according to the TA shift-down boundary line (after the affirmative decision is obtained in step S807), until the time counter Cqnup becomes equal to the predetermined value β, namely, until the predetermined waiting time corresponding to the value β has elapsed. In this respect, it is noted that the transmission 12 is shifted down according to the TA shift-down boundary line upon replacement of the Q/N shift boundary lines by the TA shift boundary lines which takes place when the accelerator pedal 58 is depressed. Thereafter, the TA shift boundary lines may be changed to the Q/N shift boundary lines because of a so-called "turbocharger lag", i.e., increase in the intake air quantity Q/N a given time after the depression of the pedal 58. In this case, the transmission 12 is likely to be shifted up according to the Q/N shift-up boundary line. Thus, the transmission 12 may be successively shifted down and up in a short period of time. According to the present embodiment, however, the shift-up action according to the Q/N shift-up boundary line is not allowed until the waiting time corresponding to the value $\beta$ has elapsed. Consequently, the successive shift-down and shift-up indicated above actions can be avoided.

Further, the shift-up action according to the Q/N shift-up boundary line following the shift-down action according to the TA shift-down boundary line is allowed if the accelerator pedal 58 is returned toward the non-operated position, at a rate higher than the predetermined threshold $|\alpha|$, namely, if the amount of change $\Delta TA$ in the throttle opening TA calculated in step SW1 of the interruption routine becomes smaller than the threshold $\alpha$ (negative value), even before the above-indicated waiting time has elapsed. The shift-up action of the transmission 12 according to the Q/N shift-up boundary line after the return speed of the accelerator pedal 58 exceeds the predetermined threshold does not give the vehicle driver an impression of an unexpected shifting of the transmission, because the vehicle driver has now an intention to decelerate the vehicle after the acceleration contemplated by depression of the accelerator pedal 58.

The present eight embodiment is thus capable of solving the problem as discussed above with respect to the sixth and seventh embodiments, by reference to FIGS. 32 and 33.

This principle of the present eight embodiment is also applicable to an engine equipped with a valve timing changing device and a swirl control valve device.

While the present embodiment has been described in its presently preferred embodiments, it is to be understood that the present invention is not limited to the details of the illustrated embodiments, but may be embodied with various changes, modifications and improvements as described below by way of examples only.

In the illustrated embodiments, the determination in steps S209, S504, S603, S703 and S803 as to whether the Q/N shift boundary lines or the TA shift boundary lines should be used is made based on the throttle opening TA and the vehicle speed SPD (FIG. 5) or engine speed NE (FIGS. 22 and 31). In the illustrated embodiments, the boundary of the throttle opening TA dividing the Q/N-control zone and the TA control zone corresponds to a level close to the maximum value of the intake air quantity Q/N at which the torque of the engine 10 is 90% or higher of the maximum value. In this respect, therefore, it is considered that the first or Q/N shift boundary lines (first shift control data map) are replaced by or changed to the second or TA shift boundary lines (first shift control data map) when the intake air quantity Q/N exceeds a predetermined threshold.

While the boundary level of the throttle opening TA (intake air quantity Q/N) used for the determination in steps S209, S504, S603, S703 and S803 varies with the vehicle speed SPD or engine speed NE, the boundary level of the throttle opening TA may be constant irrespective of the vehicle speed or engine speed.

In the illustrated embodiments, the automatic transmission 12 is a planetary gear type transmission using a plurality of hydraulically operated frictional coupling devices having two or more forward-drive positions and one reverse-drive position. However, the transmission 12 may be replaced by a constant-mesh transmission having two parallel shafts on which gears are shifted by shifters each operated by a three-position hydraulic actuator.

What is claimed is:

1. A shift control apparatus for an automatic transmission of a motor vehicle having an internal combustion engine and an accelerator pedal, comprising:
   first determining means for determining an intake air quantity (Q/N) per revolution of said engine;
   second determining means for determining a shift control parameter (TA, PA) which reflects an operation amount of said accelerator pedal;
   third determining means for determining a running speed (SPD) of the vehicle;
   fourth determining means for determining whether said intake air quantity exceeds a predetermined threshold;
   memory means for storing a first and a second shift control data map for shifting said transmission, said first shift control data map representing first shift boundary lines each representing a relationship between said intake air quantity (Q/N) and said speed (SPD) of the vehicle, while said second shift control data representing second shift boundary lines each representing a relationship between said shift control parameter (TA, PA) and said speed of the vehicle;
   map switching means for selecting one of said first and second shift control data maps, said map switching means replacing said first shift control data map by said second shift control data map when said fourth determining means determines that said intake air quantity exceeds said predetermined threshold; and
   automatic shift control means for automatically shifting said transmission, on the basis of said speed of the vehicle and said intake air quantity or said shift control parameter, and according to one of said first and second shift boundary lines which is represented by said one of the first and second shift control data maps which is selected by said map switching means.

2. A shift control apparatus according to claim 1, wherein said first shift boundary lines consist of first shift-down boundary lines and first shift-up boundary lines, while said second shift boundary lines consist of second shift-down boundary lines and second shift-up boundary lines, said map switching means being operable to select said first or second shift-down boundary lines depending upon whether or not said intake air quantity exceeds said predetermined threshold, and use said first shift-up boundary lines regardless of whether said intake air quantity exceeds said predetermined threshold or not.

3. A shift control apparatus according to claim 1, wherein that said engine has a throttle valve, and said second determining means includes a throttle sensor for detecting a throttle opening (TA) of said throttle valve, and control means for determining said throttle opening as said shift control parameter.

4. A shift control apparatus according to claim 3, wherein said fourth determining means determines whether said intake air quantity (Q/N) exceeds said predetermined threshold, by determining whether said throttle opening (TA) detected by said throttle sensor exceeds a predetermined level which varies with said speed (SPD) of said vehicle.

5. A shift control apparatus according to claim 4, wherein said fourth determining means determines said throttle opening ($TA_{i-1}$) in a last control cycle, and obtains a throttle opening value (TA) by subtracting a predetermined value from said throttle opening value, said fourth determining means determining whether said throttle opening value exceeds said predetermined level.

6. A shift control apparatus according to claim 2, wherein said second determining means includes an accelerator sensor for detecting an operation amount (PA) of said accelerator pedal, and control means for determining said operation amount of said accelerator pedal as said shift control parameter.

7. A shift control apparatus according to claim 6, wherein said fourth determining means determines whether said intake air quantity (Q/N) exceeds said predetermined threshold, by determining whether said operation amount (PA) of said accelerator pedal detected by said accelerator sensor exceeds a predetermined level which varies with said speed (SPD) of said vehicle.

8. A shift control apparatus according to claim 7, wherein said engine has a throttle valve, and said first determining means includes an intake air sensor for detecting an intake air amount (Q) of said engine, and an engine speed sensor for detecting a speed (NE) of said engine, said apparatus further comprising means for determining a target throttle opening value (TA*) on the basis of said engine speed and said operation amount (PA) of said accelerator pedal, and for commanding said throttle valve to establish said target throttle opening value.

9. A shift control apparatus according to claim 8, wherein said means for determining a target throttle opening value (TA*) determines said target throttle opening value such that a throttle opening (TA) of said throttle valve increases at a same rate as said operation amount (PA) of said accelerator pedal while said throttle opening is smaller than a predetermined threshold, and at a higher rate than said operation amount of said accelerator pedal while said throttle opening is larger than said predetermined threshold.

10. A shift control apparatus according to claim 1, further comprising:
first boundary determining means for determining a first shift boundary point (SPDqndown, SPDqnup) of said running speed (SPD) of the vehicle, on the basis of a corresponding one of said first shift boundary lines; and
second boundary determining means for determining a second shift boundary point (SPDtadown, SPDtaup) of said running speed of the vehicle, on the basis of a corresponding one of said second shift boundary lines,
and wherein said map switching means includes judging means for determining that said first shift control data map should be changed to said second shift control data map, when said fourth determining means determines that said intake air quantity exceeds said predetermined threshold,
said automatic shift control means effecting a determination as to whether or not said transmission is shifted, on the basis of a higher one of said first and second shift boundary points, when said judging means determines that said first shift control data map should be changed to said second shift control data map.

11. A shift control apparatus according to claim 10, wherein said first shift boundary lines consist of first shift-down boundary lines and first shift-up boundary lines for shifting down said transmission, while said second shift boundary lines consist of second shift-down boundary lines and second shift-up boundary lines, said first boundary determining means determines as said first shift boundary point a first shift-down boundary speed (SPDqndown) and a first shift-up boundary speed (SPDqnup), and as said second shift boundary point a second shift-down boundary speed (SPDtadown) and a second shift-up boundary speed (SPDtaup), said automatic shift control means effecting said determination on the basis of a higher one of said first and second shift-down boundary speeds and a higher one of said first and second shift-up boundary speeds.

12. A shift control apparatus according to claim 10, wherein said first boundary determining means determines said first shift boundary point before said judging means determines that said first shift control data map should be changed to said second shift control data map, and said second boundary determining means determines said second shift boundary point after said judging means determines that said first shift control data map should be changed to said second shift control data map, said automatic shift control means comparing the determined first and second shift boundary points and selecting the higher one of said first and second shift boundary points.

13. A shift control apparatus according to claim 10, wherein said engine has a throttle valve, and said second determining means includes a throttle sensor for detecting a throttle opening of said throttle valve, said fourth determining means determining whether said intake air quantity (Q/N) exceeds said predetermined threshold, by determining whether said throttle opening (TA) detected by said throttle sensor exceeds a predetermined level.

14. A shift control apparatus according to claim 1, further comprising:
fifth determining means for determining that a predetermined running condition of said vehicle is satisfied; and
inhibiting means for inhibiting said map switching means from changing one of said first and second shift control data maps to the other of said first and second shift control data maps, until said fifth determining means determines that said predetermined running condition of the vehicle is satisfied.

15. A shift control apparatus according to claim 14, wherein said engine has a throttle valve, said fifth determining means determines a substantially fully closed position of said throttle valve as said predetermined running condition of the vehicle.

16. A shift control apparatus according to claim 14, wherein said engine has a turbocharger, and said fifth determining means determines a non-turbocharging condition of said turbocharger as said predetermined running condition of the vehicle.

17. A shift control apparatus according to claim 14, wherein said map switching means includes sixth determining means for determining that said second shift control data map should be changed to said first shift control data map, when said fourth determining means determines that said intake air quantity (Q/N) is smaller than said predetermined threshold, said inhibiting means inhibiting said map switching means from changing said second shift control data map to said first shift control data map until said fifth determining means determines that said predetermined running condition of the vehicle is satisfied.

18. A shift control apparatus according to claim 14, wherein said engine has a throttle valve, and said second determining means includes a throttle sensor for detecting a throttle opening of said throttle valve, said fourth determining means determining whether said intake air quantity (Q/N) exceeds said predetermined threshold, by determining whether said throttle opening (TA) detected by said throttle sensor exceeds a predetermined level.

19. A shift control apparatus according to claim 1, wherein said first shift boundary lines include shift-up boundary lines, while said second shift boundary lines include shift-down boundary lines, said apparatus further comprising:
fifth determining means for effecting a determination that said automatic transmission has been commanded to be shifted down according to one of said shift-down boundary lines of said second shift boundary lines; and
inhibiting means for inhibiting said automatic transmission from being shifted up according to one of said shift-up boundary lines of said first shift boundary lines after said determination by said fifth determining means, until a predetermined waiting time ($\beta$) has elapsed after said determination by said fifth determining means.

20. A shift control apparatus according to claim 19, wherein said inhibiting means includes a time counter (Cqnup) which is reset when said determination is made.

21. A shift control apparatus according to claim 19, wherein said first shift boundary lines further include shift-down boundary lines while said second shift boundary lines further include shift-up boundary lines, said map switching means selecting said shift-down and shift-up boundary lines of said second shift boundary lines when said fourth determining means determines that said intake air quantity (Q/N) exceeds said predetermined threshold.

22. A shift control apparatus according to claim 1, wherein said first shift boundary lines includes shift-up boundary lines, while said second shift boundary lines includes shift-down boundary lines, said apparatus further comprising:
fifth determining means for effecting a determination that said automatic transmission has been commanded to be shifted down according to one of said shift-down boundary lines of said second shift boundary lines;
sixth determining means for determining a rate ($|\Delta \Delta TA|$) at which said accelerator pedal is returned toward a non-operated position thereof; and
inhibiting means for inhibiting said automatic transmission from being shifted up according to one of said shift-up boundary lines of said first shift boundary lines after said determination by said fifth determining means, until said rate exceeds a predetermined value ($|a|$).

23. A shift control apparatus according to claim 22, wherein said sixth determining means includes said second determining means for determining a shift control parameter (TA) which reflects an operation amount of said accelerator pedal, and means for calculating an amount of change ($\Delta TA$) in said shift control parameter (TA) during a predetermined time interval.

24. A shift control apparatus according to claim 22, wherein said first shift boundary lines further include shift-down boundary lines while said second shift boundary lines further include shift-up boundary lines, said map switching means selecting said shift-down and shift-up boundary lines of said second shift boundary lines when said fourth determining means determines that said intake air quantity (Q/N) exceeds said predetermined threshold.

25. A shift control apparatus for an automatic transmission of a motor vehicle wherein shift boundary speeds of the vehicle are determined according to shift boundary lines each representing a relationship between a running speed of the vehicle and an intake air quantity per revolution of an internal combustion engine, the transmission being shifted when the running speed of the vehicle rises above or falls below each one of said shift boundary speeds, said apparatus comprising:
first determining means for effecting a first determination that a vehicle driver is requiring running of the vehicle at a constant speed or deceleration of the vehicle;
second determining means for effecting a second determination that the running speed (SPD) of the vehicle is held constant or increasing;
third determining means for effecting a third determination that said intake air quantity (Q/N) is increasing; and
shift control means responsive to said first, second and third determining means, for shifting said automatic transmission according to said shift boundary lines, said shift control means inhibiting a shift-down operation of said automatic transmission upon said first, second and third determinations.

26. A shift control apparatus according to claim 25, wherein said engine has a throttle valve, and said first determining means effects said first determination when a throttle opening (TA) of said throttle valve is not larger than zero.

27. A shift control apparatus according to claim 26, further comprising memory means for storing a first shift control data map representing said shift boundary lines each representing a relationship between said running speed (SPD) and said intake air quantity (Q/N), as first shift boundary lines, and a second shift control data map representing second shift boundary lines each representing a relationship between said running speed and said throttle opening (TA), said shift control means controlling said automatic transmission according to said first shift boundary lines while said intake air quantity (Q/N) is smaller than a predetermined threshold, and according to said second shift boundary lines while said intake air quantity is larger than said predetermined threshold.

28. A shift control apparatus according to claim 27, further comprising fourth determining means for determining that said intake air quantity (Q/N) is larger than said predetermined threshold when said throttle opening (TA) exceeds a predetermined level.

* * * * *